(12) United States Patent
Colburn et al.

(10) Patent No.: US 8,525,081 B2
(45) Date of Patent: Sep. 3, 2013

(54) FOOD STEAMER CONTAINERS WITH SEQUENTIAL OHMIC WATER HEATING

(75) Inventors: Michael George Colburn, Burlington, VT (US); Stephen John Bogner, Colchester, VT (US); Gavin McCormick, Burlington, VT (US)

(73) Assignee: Wood Stone Ideas, LLC, Bellingham, WA (US)

( * ) Notice: Subject to any disclaimer, the term of this patent is extended or adjusted under 35 U.S.C. 154(b) by 741 days.

(21) Appl. No.: 12/542,604

(22) Filed: Aug. 17, 2009

(65) Prior Publication Data

US 2012/0061378 A1 Mar. 15, 2012

Related U.S. Application Data

(63) Continuation of application No. PCT/US2009/053794, filed on Aug. 13, 2009.

(60) Provisional application No. 61/178,970, filed on May 16, 2009.

(51) Int. Cl.
*H05B 1/02* (2006.01)

(52) U.S. Cl.
USPC ........... 219/486; 219/432; 219/483; 219/428; 392/313; 392/318; 392/322

(58) Field of Classification Search
USPC .................. 219/483–486, 481, 494, 428, 435, 219/436; 392/311, 312, 318, 322, 323, 331, 392/336; 307/41
See application file for complete search history.

(56) References Cited

U.S. PATENT DOCUMENTS 3,704,693 A * 12/1972 Hansen ................... 122/406.1
4,291,617 A   9/1981 Miller
4,447,712 A * 5/1984 Covillion ................ 219/486

(Continued)

FOREIGN PATENT DOCUMENTS

EP  1658798 A1  5/2004
GB  1095385       12/1966

(Continued)

OTHER PUBLICATIONS

Ramaswamy, Raghupathy Article: Ohmic Heating of Foods Ohio State University Extension Fact Sheet, FSE-4-05 Food Science and Technology, Columbus, OH, United States.

(Continued)

*Primary Examiner* — Mark Paschall
(74) *Attorney, Agent, or Firm* — James Marc Leas

(57) ABSTRACT

A liquid heating system includes an electric current controller, a first container, and a second container. The first container includes a first liquid and a first electric heating system. The second container includes a second liquid and a second electric heating system. The electric current controller is connected to the first electric heating system and to the second electric heating system. The electric current controller is configured to automatically alternate between providing electric current to the first electric heating system and to the second electric heating system such that when the electric current controller is providing the current to the first electric heating system the electric current controller provides no electric current to the second electric heating system and when the electric current controller is providing the current to the second electric heating system the electric current controller provides no electric current to the first electric heating system.

45 Claims, 26 Drawing Sheets

(56) References Cited

U.S. PATENT DOCUMENTS

| | | | |
|---|---|---|---|
| 4,452,132 A | | 6/1984 | Miller |
| 4,953,536 A | | 9/1990 | Isrealsohn |
| 5,226,106 A | | 7/1993 | Stirling |
| 5,571,550 A | | 11/1996 | Polny, Jr. |
| 5,607,613 A | | 3/1997 | Reznik |
| 5,609,900 A | | 3/1997 | Reznik |
| 5,630,360 A | | 5/1997 | Polny, Jr. |
| 5,740,315 A | * | 4/1998 | Onishi et al. ............ 392/489 |
| 5,758,015 A | | 5/1998 | Polny, Jr. |
| 5,771,336 A | * | 6/1998 | Polny, Jr. .................. 392/321 |
| 5,901,634 A | * | 5/1999 | Vancamp et al. ............ 99/281 |
| 6,303,166 B1 | | 10/2001 | Kolbe |
| 6,365,881 B1 | | 4/2002 | Itzhak |
| 6,940,050 B2 | * | 9/2005 | Probst ........................ 219/486 |
| 2007/0154193 A1 | | 7/2007 | Harrison |

FOREIGN PATENT DOCUMENTS

| | | |
|---|---|---|
| JP | 2006112746 A | 4/2006 |
| JP | 21058185 A | 3/2009 |
| WO | 2004081455 A1 | 9/2004 |
| WO | WO2009/100486 A1 | 8/2009 |

OTHER PUBLICATIONS

Lima, Marybeth; Zhong, Tuoxiu and Lakkakula, N. Rao Article: Ohmic Heating: A Value Added Food Processing Tool Louisiana Agriculture Magazine, Fall 2002 Baton Rouge, LA United States.

* cited by examiner

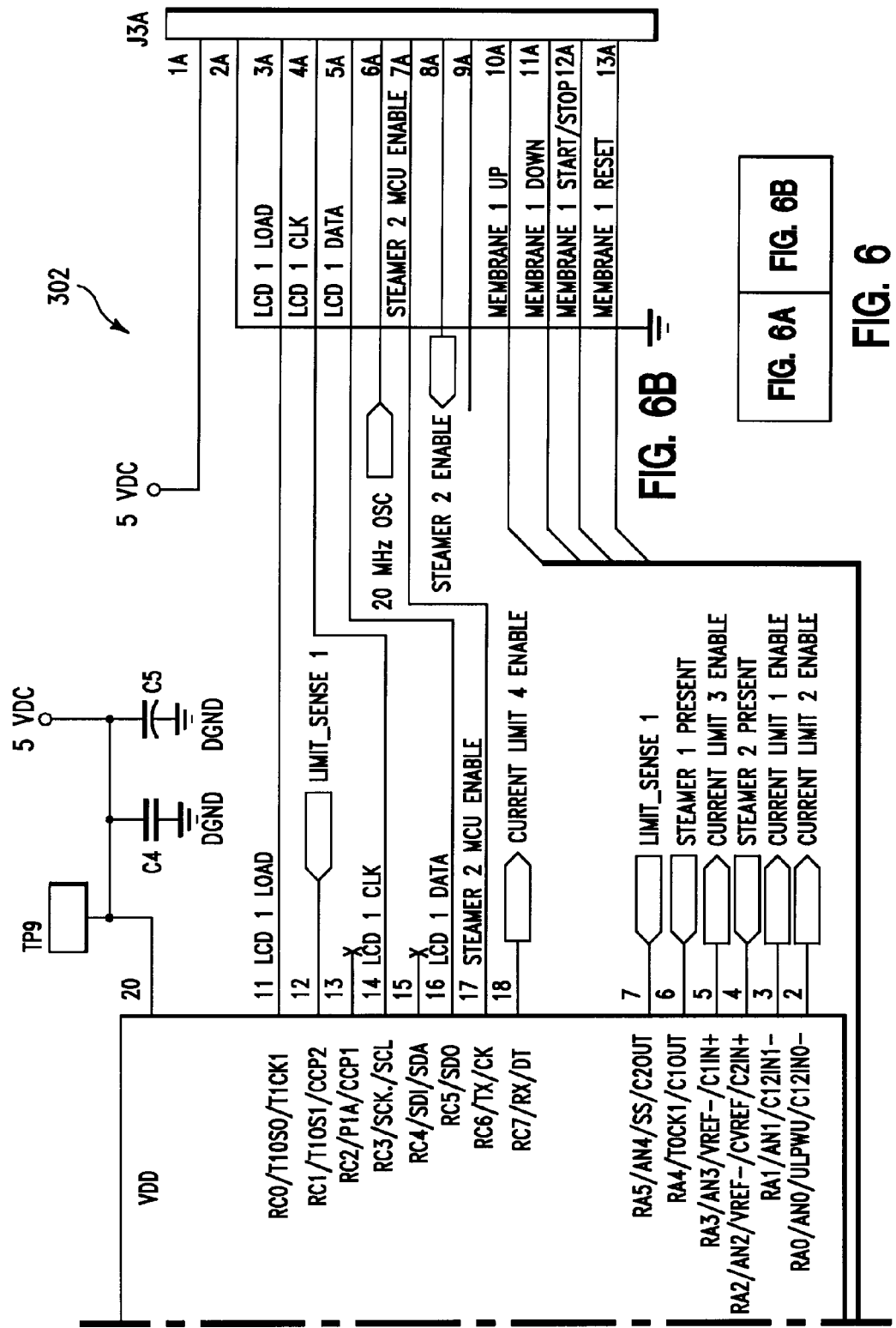

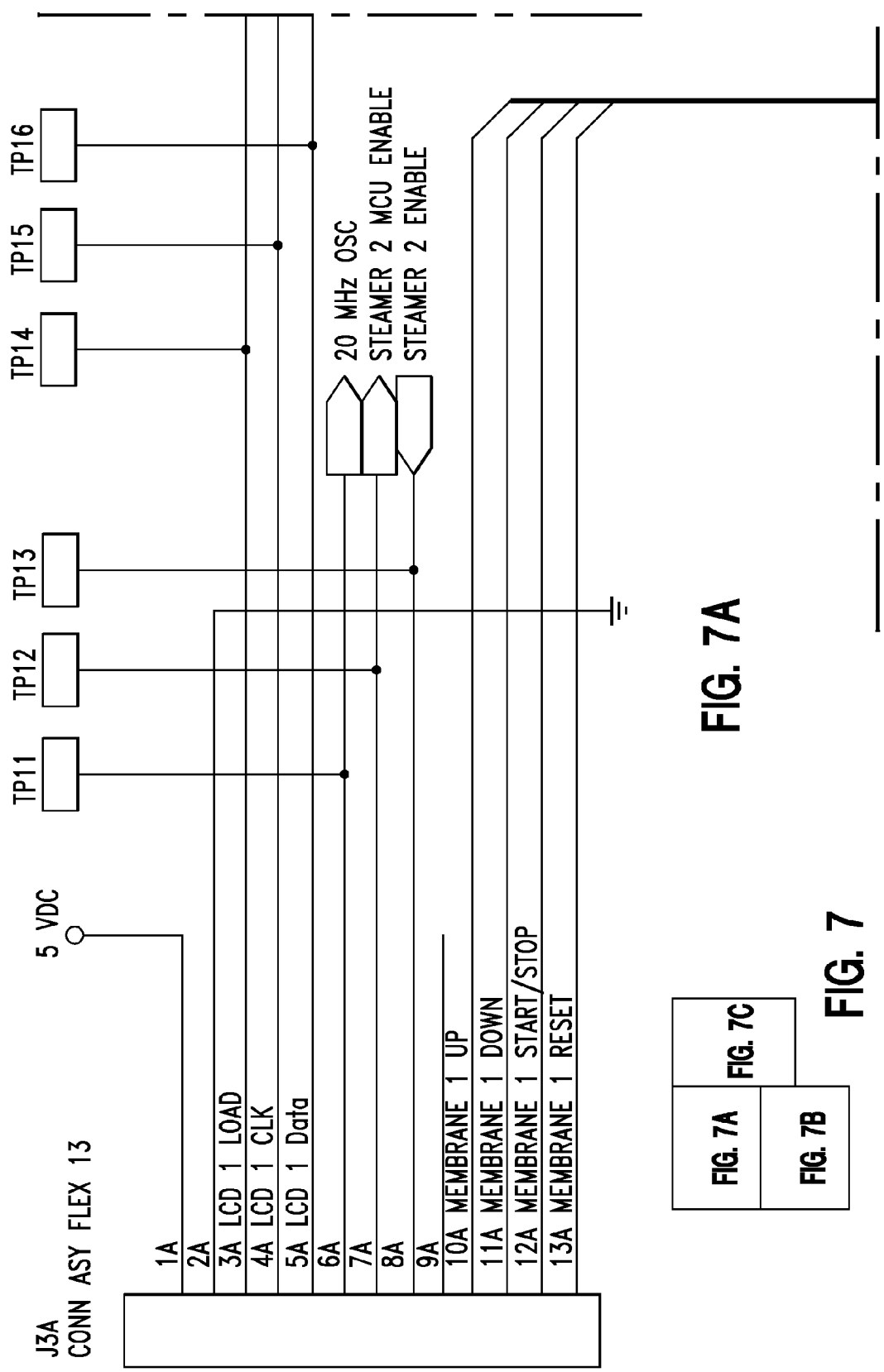

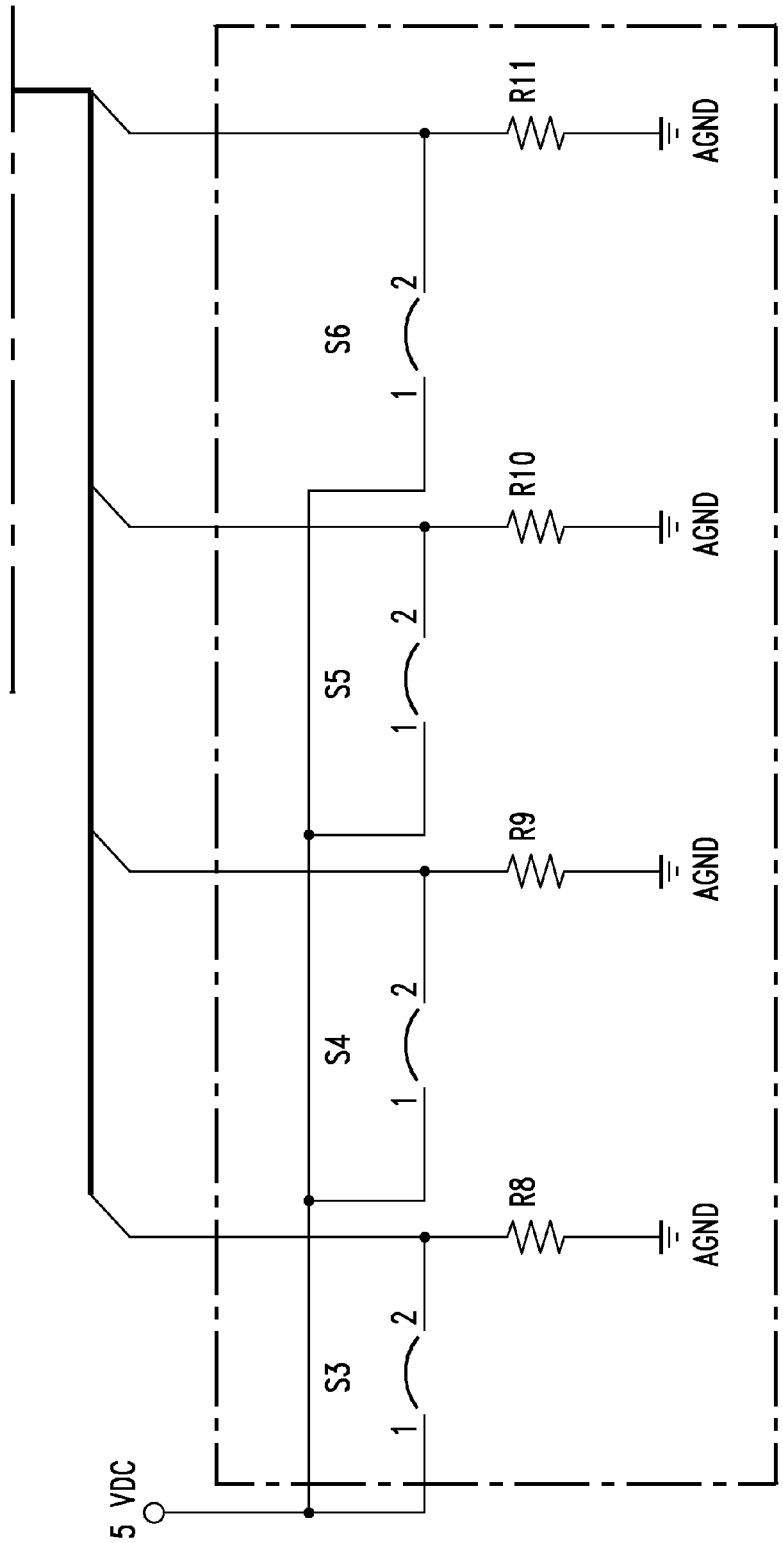

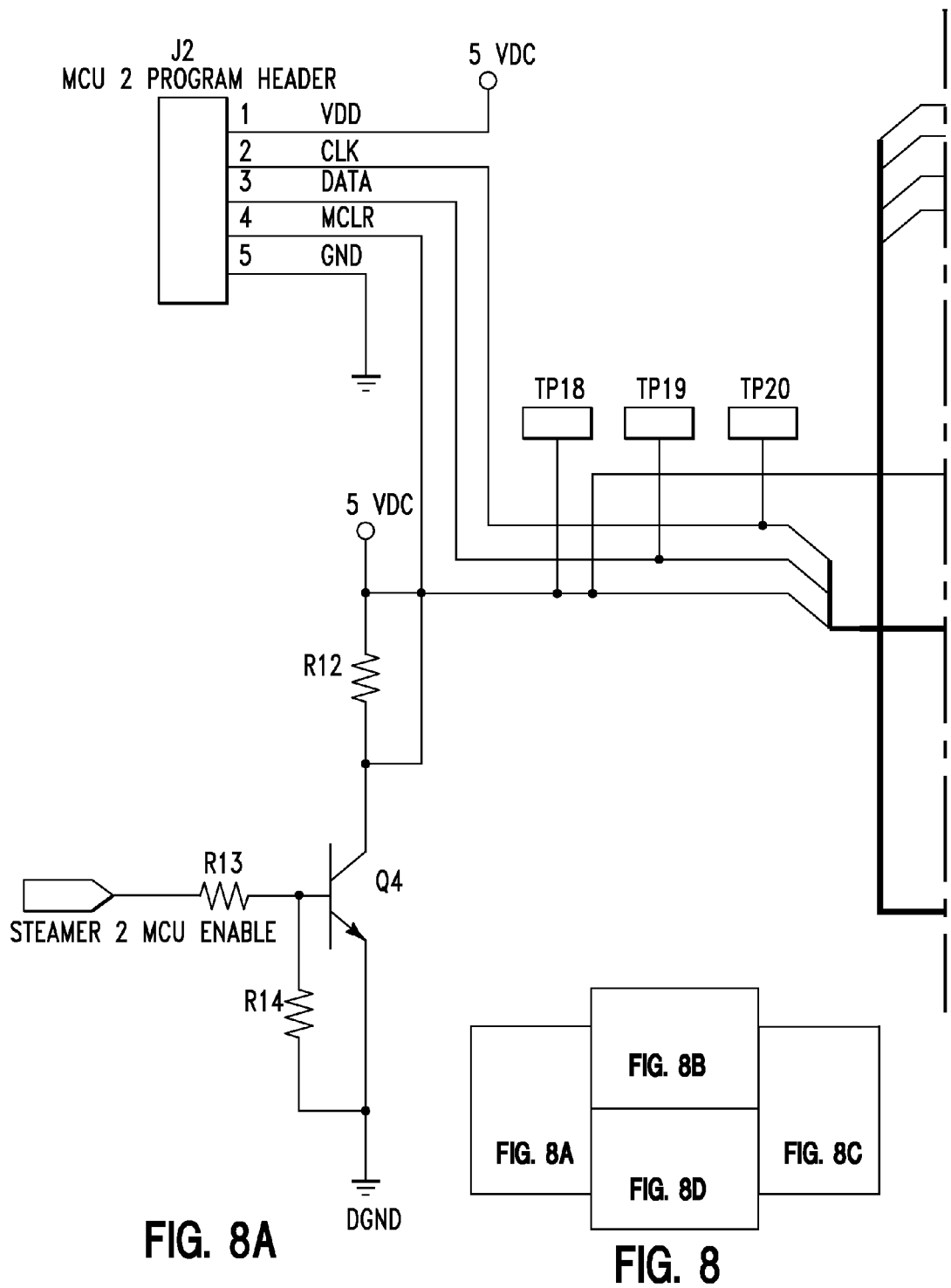

Membrane Switches

S7: UP
S8: DOWN
S9: START/STOP
S10: RESET

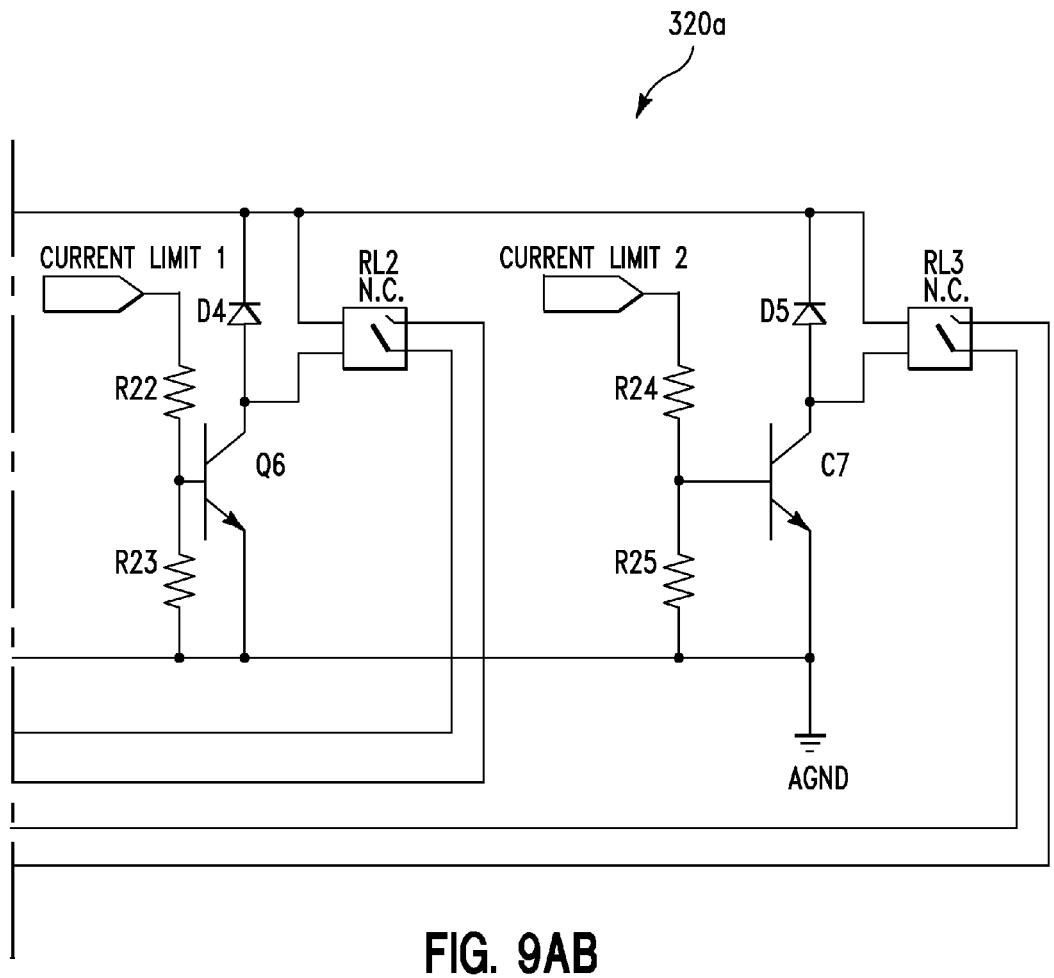
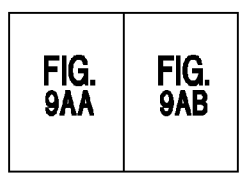
FIG. 9AB
FIG. 9A

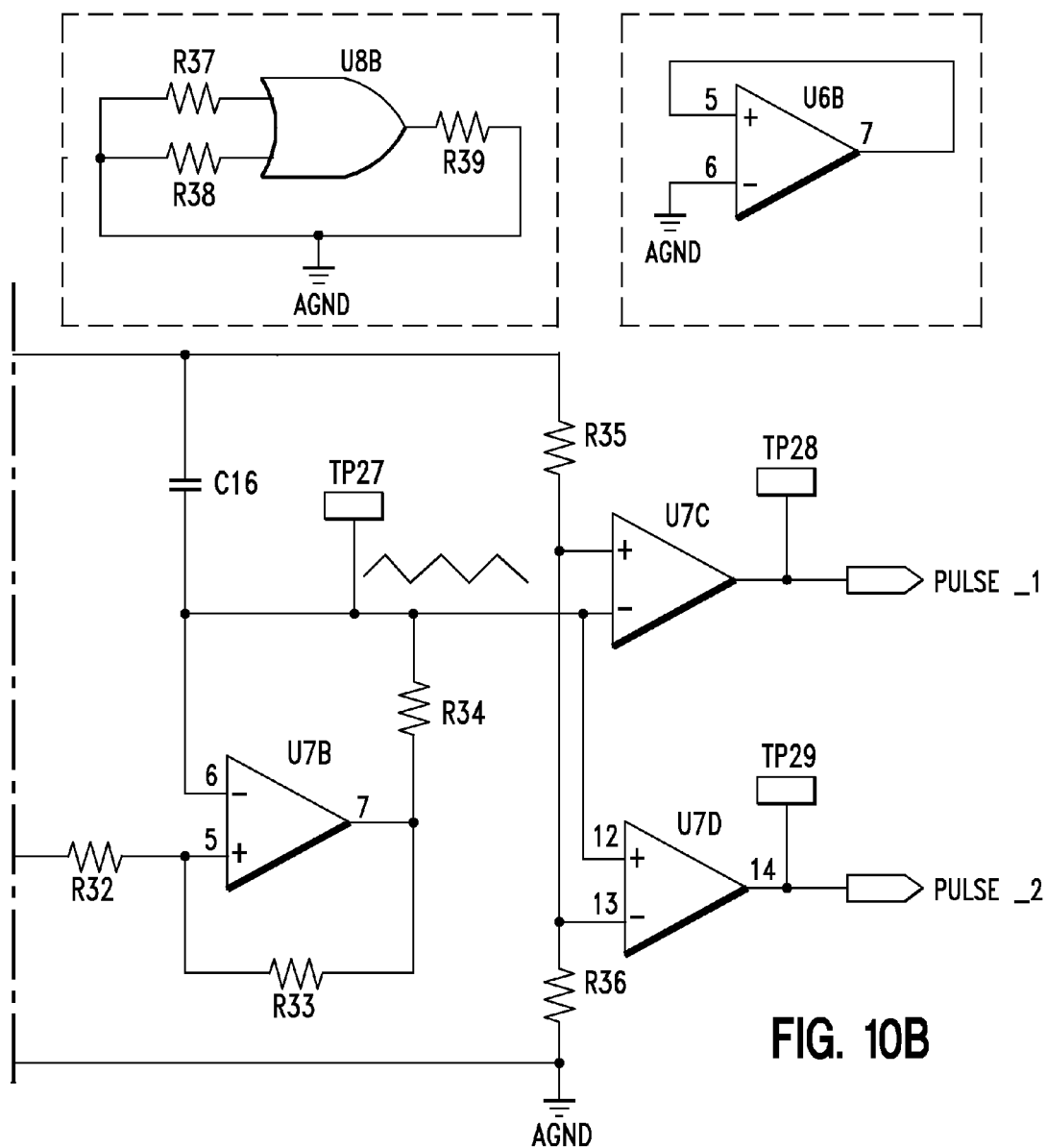

FOOD STEAMER CONTAINERS WITH SEQUENTIAL OHMIC WATER HEATING

RELATED APPLICATIONS AND PRIORITY

This patent application is a continuation of PCT application PCT/US09/53794 filed Aug. 13, 2009, entitled "Food Steamer Containers with Sequential Ohmic Water Heating," which claims the benefit of U.S. provisional patent application 61/178,970 filed May 16, 2009, entitled "Food Steamer Containers with Sequential Ohmic Water Heating," both of which are incorporated herein by reference.

This patent application is related to U.S. provisional patent application 61/088,720 filed Aug. 13, 2008, entitled "Ohmic Liquid Heating," incorporated herein by reference.

This patent application is related to US non-provisional patent application 12/542,539, filed on Aug. 17, 2009, entitled, "Rapid Liquid Heating," incorporated herein by reference, which is a continuation of PCT application PCT/US09/53794 filed Aug. 13, 2009, entitled "Rapid Liquid Heating," incorporated herein by reference.

FIELD

This patent application generally relates to liquid heating. More particularly it relates to a system for heating a liquid by flowing a current through the liquid for steaming food.

BACKGROUND

In standard resistance heating of a liquid, electrical current passes through a resistive heating element that converts electrical energy into heat. The heat conducts from the hot resistive heating element to the liquid, heating the liquid. This scheme is widely used in devices such as residential and commercial water heaters, appliances, such as dishwashers, and industrial processes. In heating water, the scheme has produced problems because the surface of the resistance heating element becomes much hotter than the liquid to be heated. This higher surface temperature causes chemicals and impurities in the liquid to react, to precipitate out of the liquid, and to adhere to the hot surface of the resistance heating element, forming a lime coating on its sheathing. Over time this lime layer builds up, and acts as a thermal insulator. Thus, the now insulated resistance element gets hotter, wasting energy. As it operates at an even hotter temperature the resistance element eventually burns out. In addition, in heating of the liquid with a standard resistance heater the electrical energy dissipated in the resistor has to first heat the resistance heating element, then the resistance element's sheathing, then any lime buildup on the element's sheathing surface, and then finally the liquid. Thus, the heating of the liquid comes after some delay.

To address these problems, the lime coating on the resistance heater may be periodically removed from the appliance for deliming to prevent burn out and frequent replacement. The maintenance process of removing the mineral surface deposits takes time, adding cost and may use harsh chemicals which are damaging to the environment, costly and potentially dangerous.

Steam appliances typically found in commercial steaming applications are oven like enclosures with a door closure to seal off the oven environment to contain steam. This door is opened to insert pans or containers of food for steaming. These steam oven appliances are fed steam from a pressure boiler or steam reservoir typically outside the oven or sometimes a reservoir located in the oven. The pressure boilers or reservoirs are powered by electric resistance heaters or gas burners.

Several problems exist with these steam appliances. The boiler or reservoir is typically powered to be in a ready to steam mode for many hours a day to accommodate steaming needs, such as in a seafood department of a supermarket. A great deal of water is heated to superheated temperatures in boilers or to just below steam temperature in reservoirs to allow for full load compartment steaming whenever needed. A lot of energy is wasted by maintaining this full load steam ready condition. The door to the steam oven must be opened to insert food to be cooked. When the door is opened a lot of steam is released to the environment, more energy and water must now be used to replace this when food is inserted, the door closed and steaming is to occur. Often one pan of food is inserted to cook in a steam oven that could accommodate several or many pans of food; therefore a lot of steam is generated for cooking a load much smaller than capacity, wasting energy and water.

Since a great deal of water is heated to the maximum requirements of a steam oven, to maintain a ready condition, a lot more dissolved particles are precipitated out of the heated water to form lime scale on electric resistance elements or to metal walls of boilers. Frequent maintenance is required, using harsh chemicals, to remove lime scale and often damage is done to elements, pipes and metal walls before maintenance is done which require expensive and inconvenient service and repair. Often steamer ovens can be out of service for days in order to repair the results of lime scale.

Waste steam is typically condensed with cold water before going to drain, wasting a lot more water.

It is typical in these steam ovens to insert one pan or portion to steam and to steam for a period of time, during this period of time the door remains closed to avoid losing steam to the environment and changing the time required to complete the cook. Because of this another order or pan of food has to wait until this first cook is completed in order to be inserted and begin its cook cycle, in this way a lot of time, energy and water is wasted. Furthermore since the entire steam oven compartment has to be filled with steam in order for the cooking to begin, the cooking time is greatly enhanced.

Since the steam oven receives pans of food for steaming, and often these pans are perforated to allow steam to contact food, cooking juices and food particulate drip into the cooking compartment. It is not practical or convenient to shut down a steamer oven during hours of operation to clean between cooks and therefore all waste deposited in the steam oven compartment remain there until the end of the days cooking Subsequent pans of food are steamed in waste that accumulated during the day's operation. At the end of a day's cycle a time consuming and unpleasant cleaning is required.

Thus, better techniques for heating liquids are needed, in particular for steaming food, and these techniques are provided in this patent application.

SUMMARY

One aspect of the present patent application is a liquid heating system that includes an electric current controller, a first container, and a second container. The first container includes a first liquid and a first electric heating system. The second container includes a second liquid and a second electric heating system. The electric current controller is connected to the first electric heating system and to the second electric heating system. The electric current controller is configured to automatically alternate between providing electric current to the first electric heating system and to the second electric heating system such that when the electric current controller is providing the current to the first electric heating system the electric current controller provides no electric current to the second electric heating system and when the electric current controller is providing the current to the second electric heating system the electric current controller provides no electric current to the first electric heating system.

Another aspect of the present patent application is a liquid heating system that includes an electric current controller and a plurality of containers. Each container of the plurality of containers holds a first electrode, a second electrode, and a conductive liquid, wherein each conductive liquid has a conductivity. The first electrode and the second electrode are connected to the electric current controller to provide an electric current passing through the conductive liquid. The electric current controller includes a circuit that provides the electric current to pass through the conductive liquid in one of the containers for a period of time while not providing the electric current to pass through another conductive liquid in any another container during that same period of time. The electric current controller sequentially and automatically provides the current to the conductive liquid in all of the containers during a multiple of the period of time.

Another aspect of the present patent application is a liquid heating system that includes a base unit and a plurality of electric steam cooking containers. Each of the electric steam cooking containers is removably electrically connected to the base unit with a quick connect and quick release connector. The base unit provides an automatic control function over operation of each the electric steam cooking container. Steam is generated in each the electric steam cooking container independently of any other electric steam cooking container being connected.

Another aspect of the present patent application is a method of heating a liquid, comprising providing a first container and a second container, wherein the first container and the second container each hold a liquid and an electric heating system. The method also includes providing an electric current controller and using the electric current controller to provide current to the electric heating system in the first container for a period of time while not providing electric current to the electric heating system in the second container during that same period of time. The method also includes using the electric current controller to provide current to the electric heating system in the second container for a period of time while not providing electric current to the electric heating system in the first container during that same period of time.

Another aspect of the present patent application is a liquid heating system that includes a steam cooking container having an adjustable steam vent.

Another aspect of the present patent application is a method of heating a liquid that includes providing a container, a conductive liquid, and an electric heating system, wherein the container contains the conductive liquid, wherein the conductive liquid has a conductivity, wherein the electric heating system provides heat to the conductive liquid by passing an electric current through the conductive liquid. The method also includes providing an electric current controller circuit and an electric current measuring device, using the electric current controller circuit to provide a current to the electric heating system, using the electric current measuring device to measure the current flowing in the electric heating system, and using the electric current controller circuit to reduce power provided to the electric heating system when the electric current measuring device detects a dip in current flowing in the conductive liquid.

Another aspect of the present patent application is a method of heating a liquid that includes providing a container, a conductive liquid, and an electric heating system, wherein the electric heating system includes a plurality of electrodes, wherein the container contains the conductive liquid and the electrodes, wherein the conductive liquid has a conductivity, wherein the electric heating system provides heat to the conductive liquid by passing an electric current between the electrodes and through the conductive liquid. The method also includes providing an electric current controller circuit, using the electric current controller circuit to provide a current to the electric heating system, using the electric current measuring device to measure the current flowing in the electric heating system, and using the electric current controller circuit to reduce power provided to the electric heating system by disconnecting electrical connection to one of the electrodes.

Another aspect of the present patent application is a liquid heating system that includes an electric current controller and a first container. The first container includes a first liquid and a first electric heating system. The electric current controller is connected to control operation of the first electric heating system. The electric current controller is configured to automatically alternate between providing electric current to the first electric heating system and providing no electric current to the first electric heating system. The electric current controller includes a circuit for adjusting time for providing electric current to the first electric heating system and for providing no electric current to the first electric heating system.

BRIEF DESCRIPTION OF THE DRAWINGS

The foregoing will be apparent from the following detailed description as illustrated in the accompanying drawings, for clarity not drawn to scale, in which:

FIG. 3b is top view of the embodiment of the container of FIG. 3a;

FIG. 6, including FIG. 6a-6b is a schematic diagram of the main micro controller of an embodiment of a liquid heating system of the present patent application;

FIG. 7, including FIG. 7a-7c, is a schematic diagram of a timer interface for an embodiment of a liquid heating system of the present patent application;

FIG. 8, including FIG. 8a-8d, is a schematic diagram of an LCD interface for an embodiment of a liquid heating system of the present patent application;

FIG. 10, including FIG. 10a-10b, is a schematic diagram of a pulse width modulation circuit for sharing current between two containers in one embodiment of a liquid heating system of the present patent application;

DETAILED DESCRIPTION

The various embodiments of the device of the current patent application provide improvement over previous steam cooking devices. In one embodiment, the steam containers are individual and sized to a cooking portion, therefore only enough steam is required to perform the cooking function. Steam, energy and water are conserved.

In one embodiment, all steam is generated in an individual steam container in which food is cooked. Remote steam generation, and therefore excess steam generation are avoided saving money, energy and water. Since, in this embodiment, the container is sized to an individual cook portion, much less steam and water are used, and therefore the time to produce steam is greatly reduced, avoiding the need to maintain a lot of super heated water ready for steam production.

In one embodiment, steam is only generated in the cooking space after the product to be cooked has been added and a lid has been put in place. Therefore steam is not lost opening and closing doors to insert the product.

In one embodiment, energy is only provided when there is steam cooking to be done and energy use is terminated as soon as the cook time has expired. Maintaining boilers and reservoirs at a steam ready condition are avoided.

In one embodiment, liming is avoided because electrodes do not precipitate dissolved particles out of the water since they do not get hotter than the water.

In various embodiments, steam is not taken to building drains, and therefore a steam condenser, typically required by code, is not required.

In one embodiment the device of the current patent application includes two or more containers. Thus, starting one steam order does not have to wait for another steam order to finish. Time is also saved since the container is sized to receive a single steam portion, only enough steam is generated for that portion and little is wasted on excess space or in release to the environment.

Since various embodiments of the device of the current patent application have removable steam containers, the containers can be rinsed at a sink between uses very conveniently, thus providing a clean container for each steam cook, facilitating a more sanitary and healthier cook environment and reducing an unpleasant and time consuming cleaning job typical of steamers. In addition, various embodiments of the container of the current patent application call for little or no maintenance, and they can be easily repaired or replaced.

Figure 1:
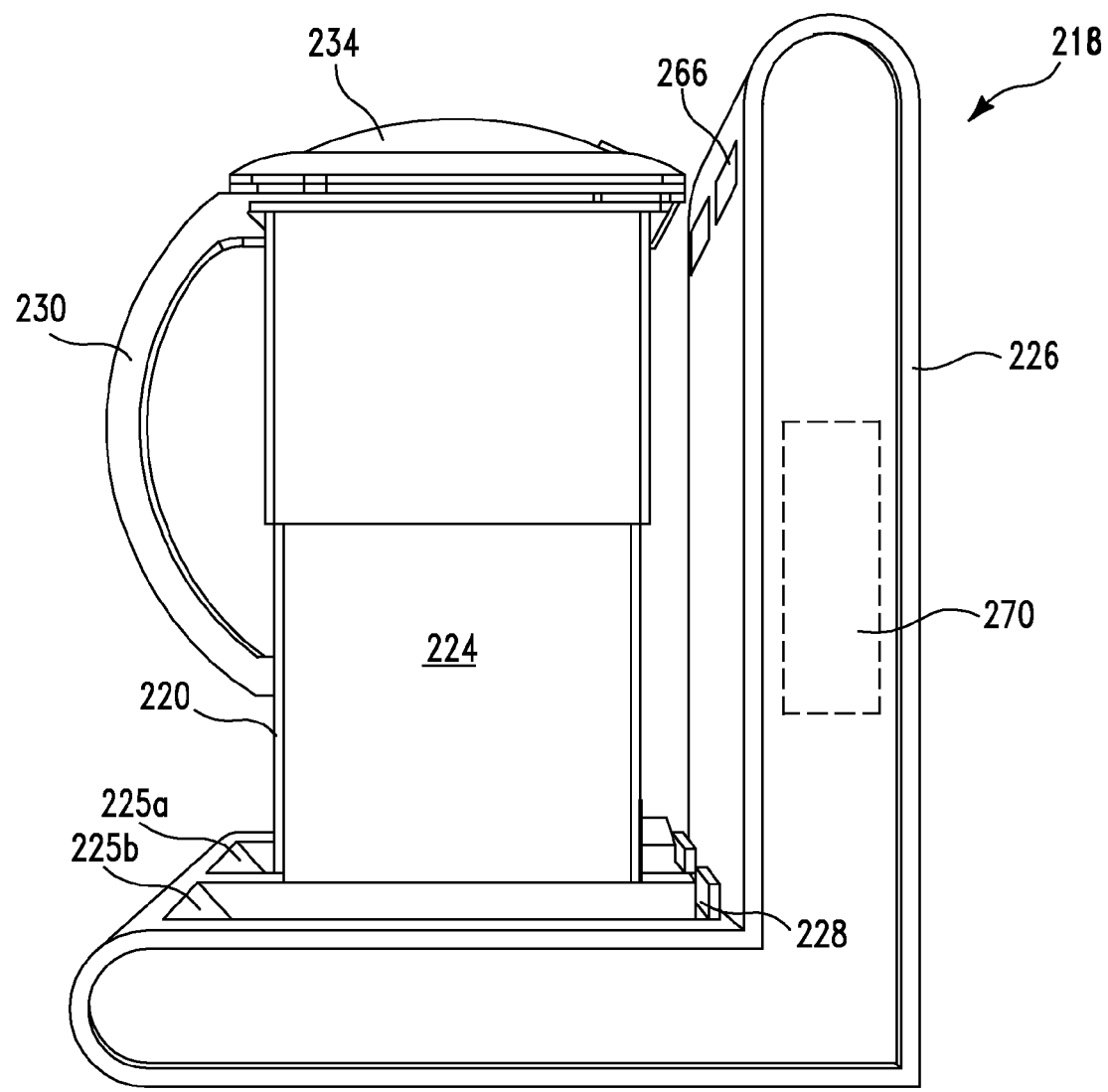
FIG. 1 is cross sectional view of one embodiment of a liquid heating system of the present patent application including a container plugged into a base unit.
Figure 2A:
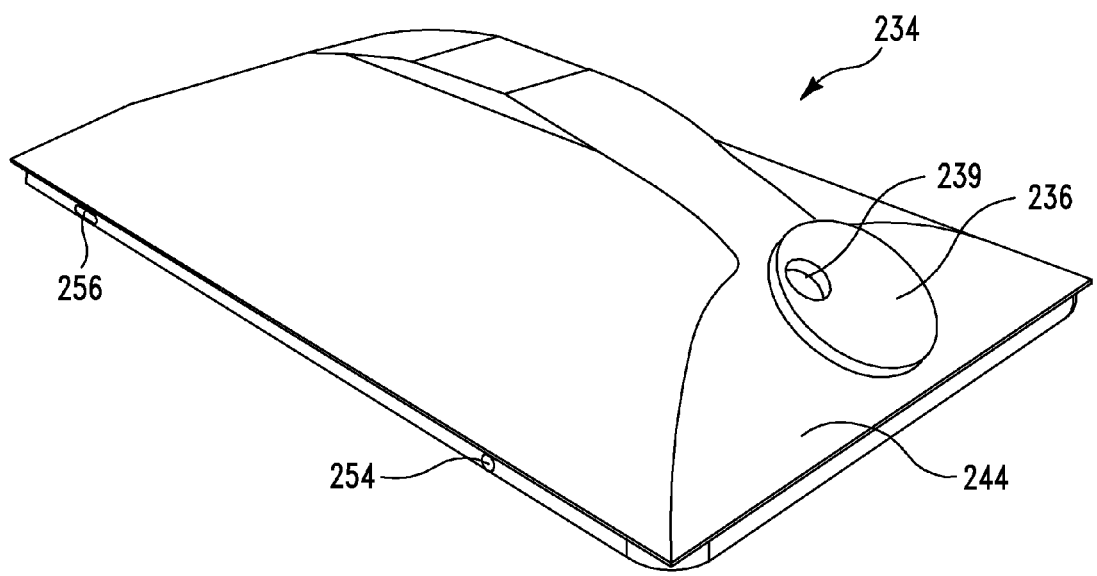
FIG. 2a is three dimensional view of one embodiment of a lid of the container plugged of FIG. 1 with a steam vent adjustment control knob in place.
Figure 2B:
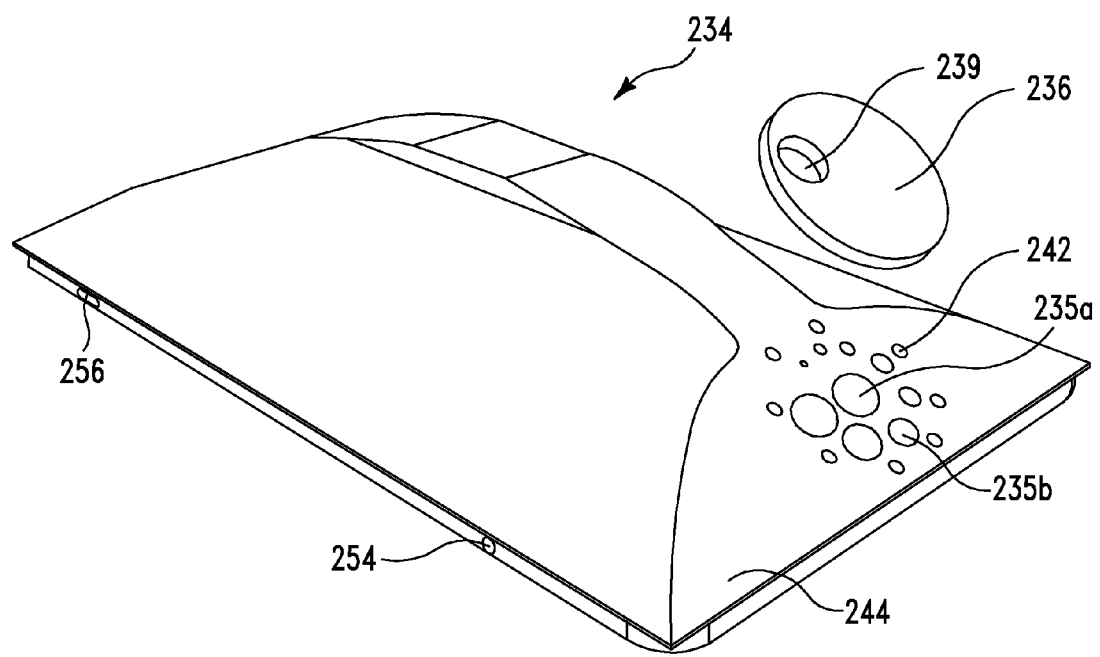
FIG. 2b is three dimensional exploded view of the embodiment of a lid of the container of FIG. 2a showing one way to provide an adjustable steam vent.
Figure 3A:
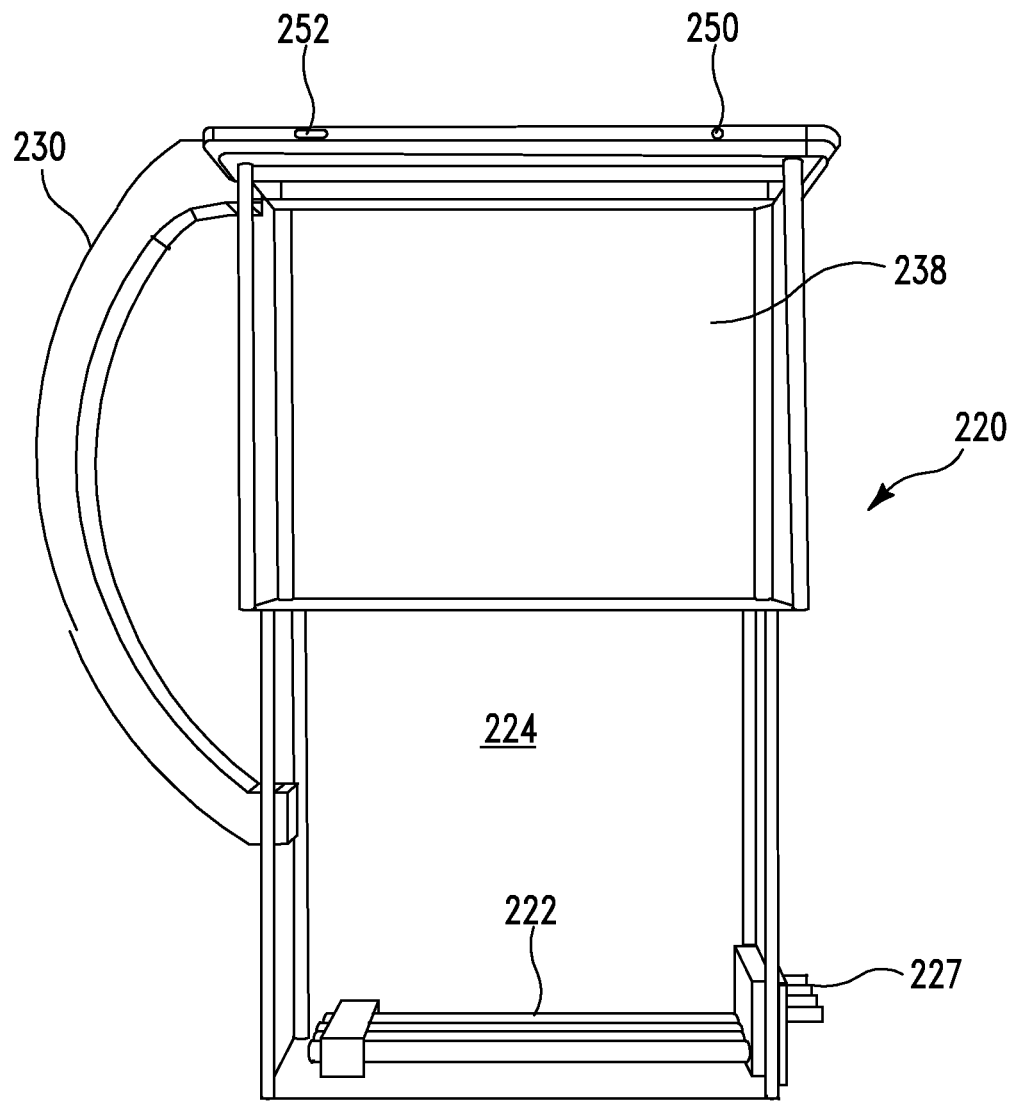
FIG. 3a is cross sectional view of one embodiment of the container of FIG. 1 showing the electrodes between which current flows in the electrically conductive liquid.
Figure 3B:
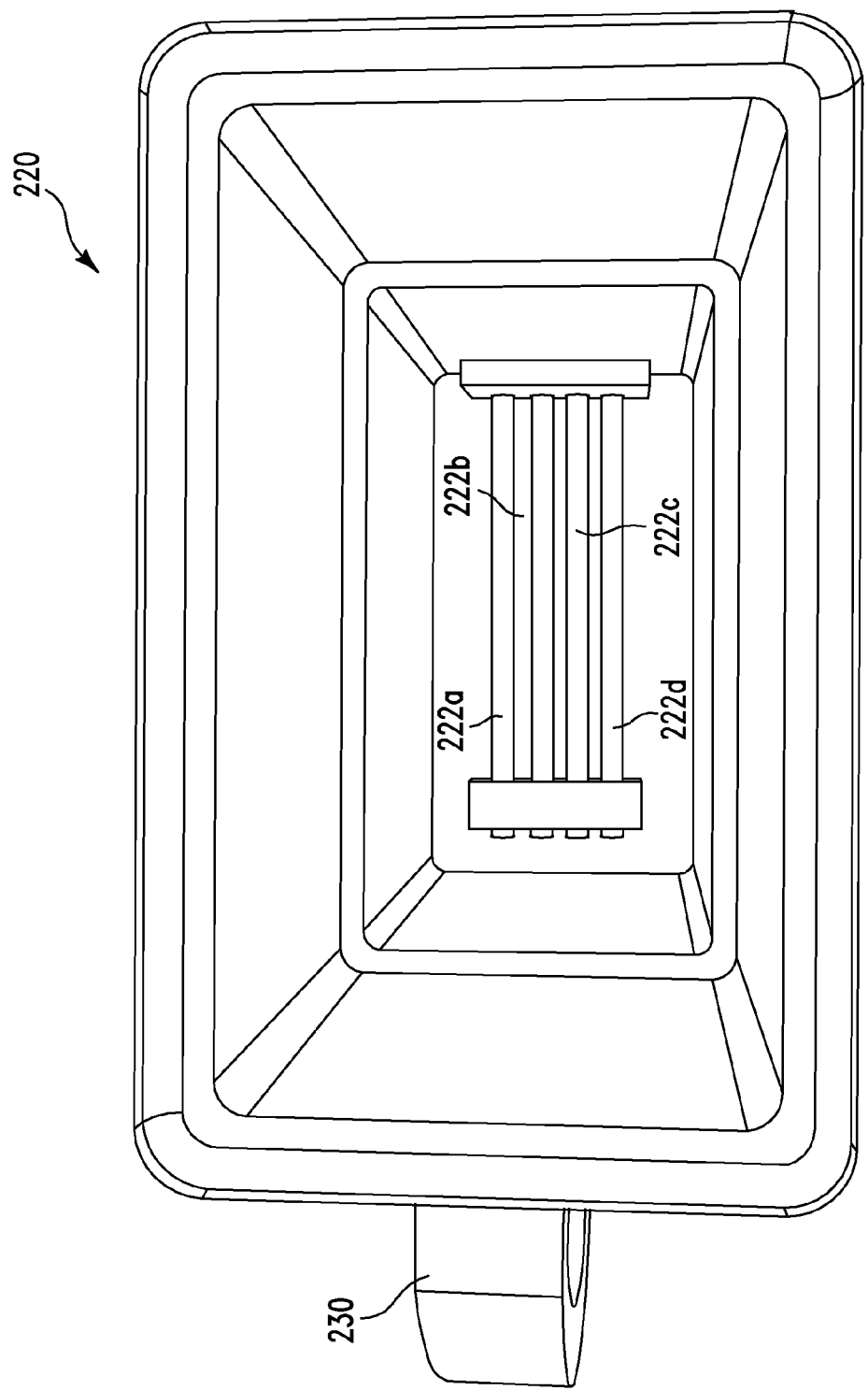

Device 218 includes two or more separate containers 220 for steaming food, as shown in FIGS. 1, and 3a-3b. Each separate container 220 holds electrodes 222 and water 224, as shown in FIGS. 3a-b.

Container 220 is fabricated of a material, such as high density polyethylene, glass, and a dielectric coated metal. The metal can be aluminum, or stainless steel. The dielectric coating for the metal can be a material such as PTFE. In one embodiment tested by applicants, a high thermal BPA free plastic such a HDPE was used. Electrodes made of a material, such as graphite, titanium, or a noble metal work satisfactorily.

Figure 4:
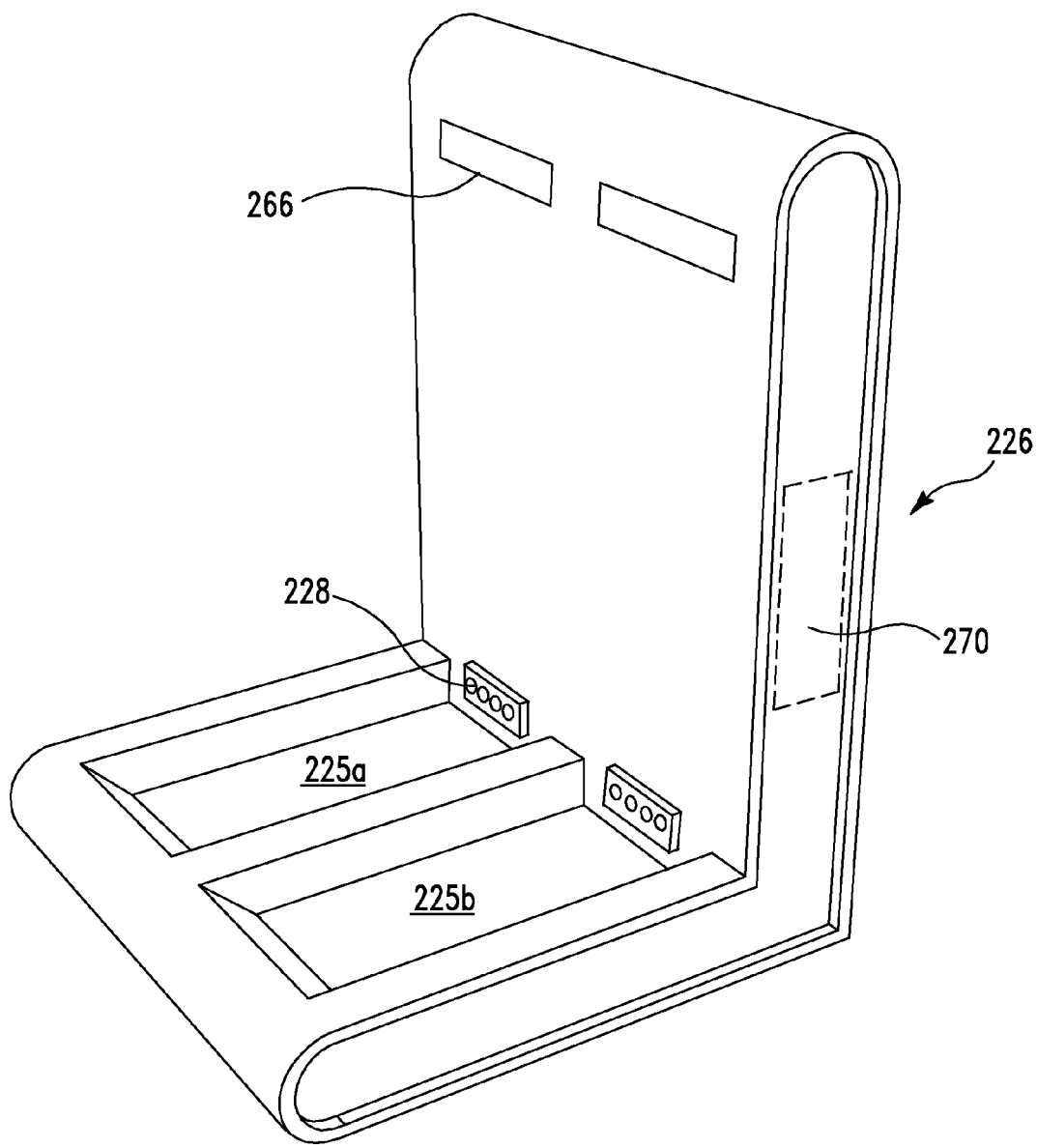
FIG. 4 is three dimensional view of one embodiment of the base unit of the liquid heating system of FIG. 1.

In one embodiment, each independent container 220 electrically and mechanically connects to one of the attachment slots 225a, 225b in base unit 226 by virtue of electrical contacts 228 as shown on FIG. 4. Base unit 226 provides electricity to electrodes 222 of each independent container 220 through electrical contacts 227 on each independent container 220 that plug into a corresponding outlet 228 on base unit 226. Electrical contacts 227 provide a quick connect and quick release connector. Magnets (not shown) located between electrical contacts 227 may be provided to firm mechanical connection between container 220 and base unit 226. By pulling on handle 230, each independent container 220 can be easily electrically disconnected and physically removed from attachment slot 225 in base unit 226. Removal facilitates adding or removing water or food from container 220. Removal also facilitates cleaning container 220.

In one embodiment, container 220 has removable lid 234 which includes steam vents 235a, 235b, steam vent adjustment control knob 236 and steam chamber 238. Steam vent adjustment control knob 236 can be closed to create a closed steam chamber or steam vent adjustment control knob 236 can have port 239 aligned with one of steam vents 235a, 235b. In operation, the cook can adjust the size of steam vents 235a, 235b in lid 234 aligned with port 239 to vary the slight back pressure in steam chamber 238 of container 220. Providing a slight back pressure ensures that food is completely surrounded by steam and reduces cooking time. Applicants found that ability to adjust pressure also allows for accommodating more food types and better cooking results.

In one embodiment, steam pressure is adjusted by rotating steam vent adjustment control knob 236 over steam vents 235a, 235b in lid 234. Protrusions (not shown) in bottom surface of steam vent adjustment control knob 236 that match with indents 242 in top surface 244 of lid 234 are used to keep control knob 250 in the position selected.

In one embodiment, container 220 has shaped protrusions 250, 252 and removable lid 234 has shaped indents 254, 256 that match shaped protrusions 250, 252. When fitted together shaped protrusions 250, 252 and shaped indents 254, 256 form a restraint to keep removable lid 234 in position despite a slight steam pressure that may build in steam chamber 238 during operation. Shaped protrusions 250, 252 and shaped indents 254, 256 also insure that lid 234 is positioned properly on container 220 to activate proximity sensor 266 on container 220. Lid 234 includes a magnet (not shown) that activates proximity sensor 266 when lid is properly positioned on container 220.

Device 218 can be used to heat water to produce steam within steam chamber 238 of each independent container 220. The heat is provided to water 224 as current passes through water 224 while traveling between immersed electrodes 222. Water 224 is Ohmic heated by this flow of current according to P=VI. Because nearly all the voltage drop is across water 224 in the gap between electrodes 222 and very little power is dissipated in the electrodes themselves, electrodes 222 do not get hotter than water 224 in which they are immersed.

Water 224 includes ions, such as salt, to enhance its conductivity to facilitate this current flow. In one embodiment, ions are provided by adding salt or seasoning containing salt or another electrolyte containing material to water in container 220. In one embodiment, ionic content and conductivity of water 224 is adjusted by adding more or less salt or seasoning to the water.

In one embodiment, electric current controller 270 located in base unit 226 is plugged into a standard 120 Volt wall outlet to receive power for distribution to electrodes 222a, 222b, 222c, 222d in containers 220. For providing higher power an outlet supplying a higher voltage, such as 200 Volts, 208 Volts, 220 Volts, and 240 Volts can be used.

In one embodiment, electric current controller 270 provides that water 224 in each container 220 receives current regardless of the presence of another container in a neighboring slot of the same base unit 226. Thus, current will be provided to a single container 220 inserted into either slot 225a or 225b in base unit 226 or to two containers 220 inserted into both slots of base unit 226.

In one embodiment, roughly the same amount of current—and heat—is provided to water in each of these separate containers so water in both heats up at about the same rate. A difference in heating rate from container to container is provided by varying the concentration of electrolyte in each container.

One feature of the arrangement of the present patent application is that if container 220 is plugged into base unit 226 while container 220 has insufficient water to fill the gap between electrodes 222, an open circuit results and no current flows in that container. Similarly, if container 220 is left unattended and water boils off, current will cease flowing when sufficient water has boiled off so the water level falls to a point just below an electrode, automatically opening the circuit well before all water has boiled off.

In one embodiment, electric current controller 270 includes a circuit that provides electric current to electrodes 222 in container 220 plugged into slot 225a in base unit 226 for a first period of time while not providing any electric current to electrodes in the neighboring container plugged into slot 225b during that same first period of time. Then after this first period of time is complete, the circuit in electric current controller 270 provides electric current to the electrodes in the neighboring container plugged into slot 225b in base unit 226 for a second period of time while not providing any electric current to electrodes 222 in container 220 plugged into slot 225a during that second period of time. This cycle repeats, alternately supplying current to water in one container, then to water in the other container sequentially.

Applicants built and tested apparatus using this scheme that has a frequency of about ¼ second. In that embodiment, each container received full power for ⅛ second intervals separated by ⅛ second gaps during which that container received no power and during which the other container received the full power. In this manner water in both containers was heated to boiling while electrodes in each container received nearly the full current that could safely be provided by the wall outlet circuit at a voltage that was equal the full voltage available from the wall outlet. Each container received nearly the maximum current available from the wall outlet circuit with a duty cycle of 50%.

Power provided to both containers was substantially higher than could be achieved in a standard parallel circuit arrangement of the containers which would have required a substantially lower voltage to be applied across each container to avoid the combined current to both containers exceeding the maximum current available from the wall outlet circuit. The unique arrangement in this embodiment of the present patent application of providing current sequentially to electrodes in each container avoids a voltage reduction to each container. It also permits one of the containers to be removed while allowing the other container to continue to be in use, a feature that would not be available with a series arrangement of the containers.

Electric current controller 270 also includes a current limiting circuit that limits the current to a value that is less than the safe limit of the supply outlet circuit, which for example, is 20 Amperes for a typical 120 Volt circuit breaker circuit. For example, the current limiting circuit may limit the current to a value that is about equal to half of the safe limit, that is in the range from half to ¾ of the safe limit, or that is equal to or greater than ¾ of the safe limit but less than the safe limit. In one embodiment the current limiting circuit limits current without reducing the full line voltage applied between electrodes. This arrangement allows faster cooking while allowing for more variation in the conductivity of water 224. Thus, if water 224 has sufficient salt concentration to allow current to exceed the 20 Ampere maximum, the current limiting circuit allows no more than a specified current to flow. The present applicants found this arrangement provided more flexibility than would be available with the alternative of opening a switch, circuit breaker, or fuse, which would entirely shut down current to avoid exceeding the current limit. In one embodiment, current limiting circuit includes an ammeter to measure the current and the measurement is fed to a PLC controller that varies the applied voltage to maintain the desired current. Another scheme for limiting current removes certain electrodes from electrical connection, as described herein below. The current limiting circuit allows current in each container 220 to be limited to a fixed value while maintaining the full line voltage across electrodes despite variation of conductivity of water 224 from container to container.

In one embodiment, the amount of time current flows to each container, or the dwell time, remains the same regardless of the number of containers connected. Maintaining constant dwell time maintains a constant heating rate, providing a consistent cooking time. In another embodiment, a logic circuit is used that determines how many containers 220 with sufficient water are plugged into slots in base unit 226 and automatically adjusts to this number of containers. For example, in the case where only one container is in use the logic circuit skips the circuit that divides the time current is provided to that container and thereby automatically provides for uninterrupted provision of power to electrodes in that container.

Applicants found that the direct Ohmic heating of water by providing a current passing through the water was substantially more efficient than systems that used a resistance heater in the water. As described herein above, the direct ohmic heating by passing current through the water keeps the electrodes at the same temperature as the water, avoiding lime build up which occurs on the very hot surface of resistance heating elements immersed in water.

Figure 5A:
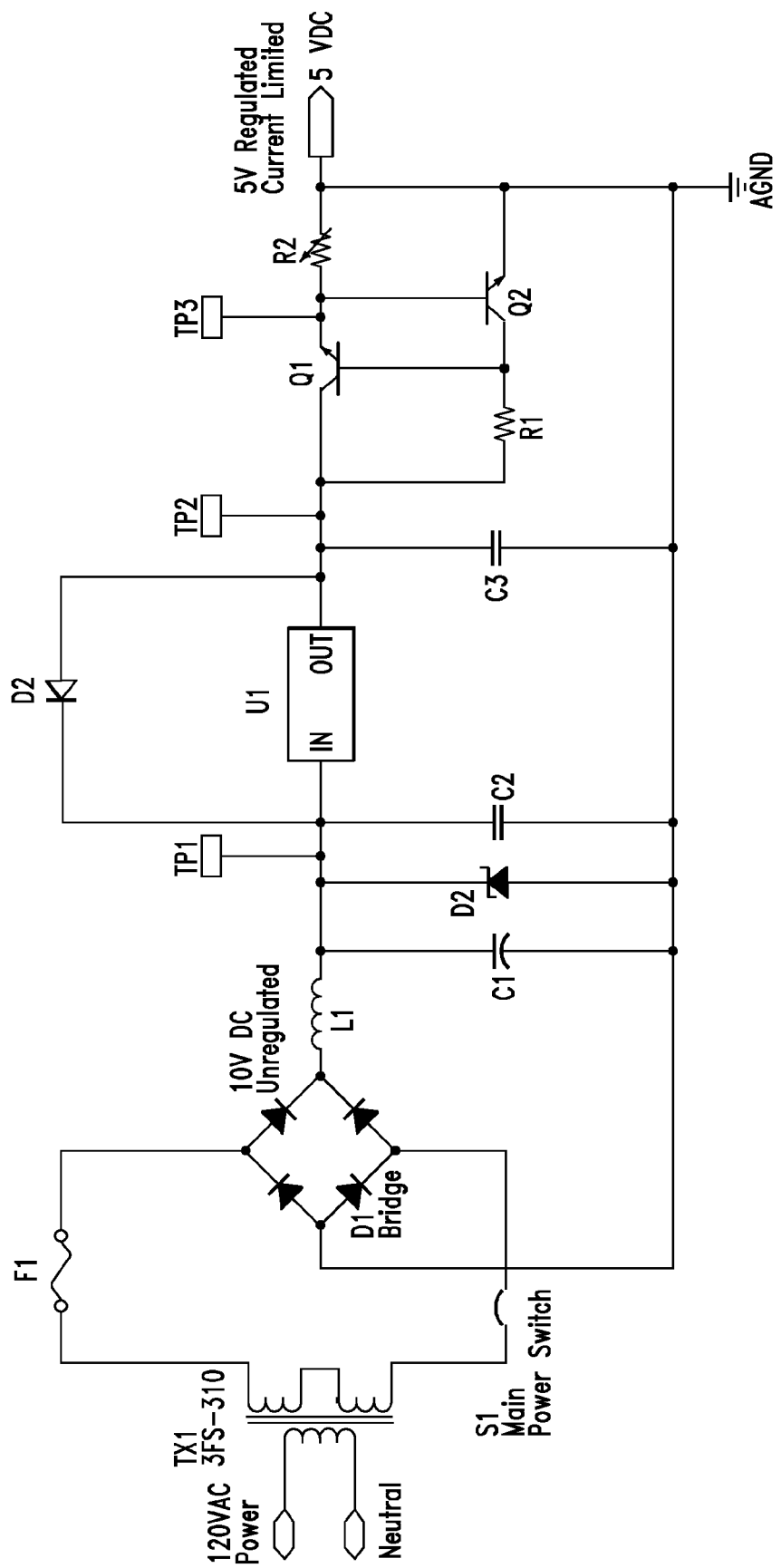
FIG. 5a is a schematic diagram of the power supply for powering electronic circuits of an embodiment of a liquid heating system of the present patent application.

Power Supply:

While power for heating water in containers 220 uses the 120 Volts available from a wall outlet supply through power connector J1, power supply 300 converts that wall outlet power to regulated 5 Volts DC for powering control electronic circuits. The 120 VAC wall outlet supply is fed into transformer TX1 which steps 120 Volts down to 10 Volts, as shown in FIG. 5a. Switch S1 controls main power to the unit, and over-current fuse F1 opens the circuit if current in the 10 Volt circuit exceeds 16 Amperes. This 10 Volt AC is then fed into full bridge rectifier D1 which provides an unregulated 10 Volt DC output to inductor L1.

Figure 5B:
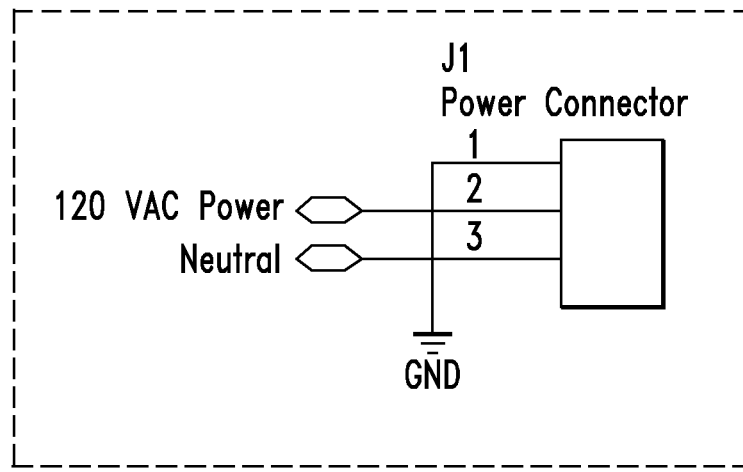
FIGS. 5b and 5c are schematic diagram of the power connector and ground tie points.
Figure 5C:
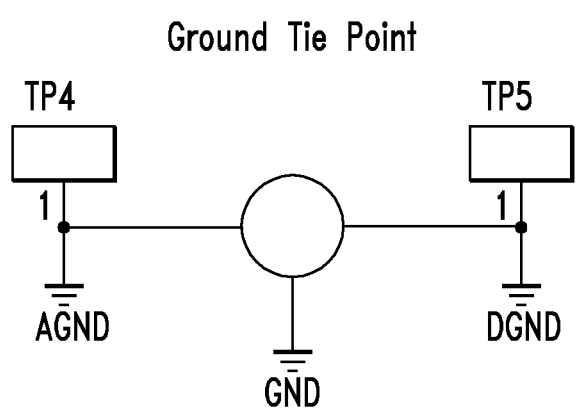

The J1 power connector is a terminal block in line from the main line power input where a cord set would be installed, as shown in FIG. 5b. Analog and digital ground connections, AGND and DGND, are tied together and are shown in FIG. 5c.

L1 and C1 form an LC filter that filters out transient oscillations of lower frequencies, such as over current surges, and negative voltages that may hurt voltage regulator U1. Zener diode D2 protects against over voltages in the case of the transformer failing. Zener diode D2 is rated to 30V, the maximum voltage that voltage regulator U1 can withstand at its input. U1 is a 5V regulator, such as part number LP2954IS/NOPB available from National Semiconductor, Santa Clara Calif. Frequency filters C2 and C3 filter high transient oscillations and diode D2 is a safety diode that further protects voltage regulator U1 in the case of a negative voltage across its terminals.

From here the regulated and filtered 5 volt output of voltage regulator U1 passes through current regulator U1b that has a variable current limit. Current regulator U2 includes transistors Q1, Q2 and resistors R1 and R2. Transistor Q1 is a pass transistor that acts as a switch. Transistor Q2 controls transistor Q1 via the base of transistor Q1. As current is drawn by a load through variable resistor R2, a voltage equal to I×R1 appears across R2 and between base and emitter of Q2. When this voltage is sufficient, transistor Q2 turns on, pulling Q1's base to ground effectively turning Q1 off, preventing further current flow to the rest of the circuit. Thus, the current limiter acts as a resettable fuse to limit the current in abnormal circumstances.

Main Microcontroller

Figure 6A:
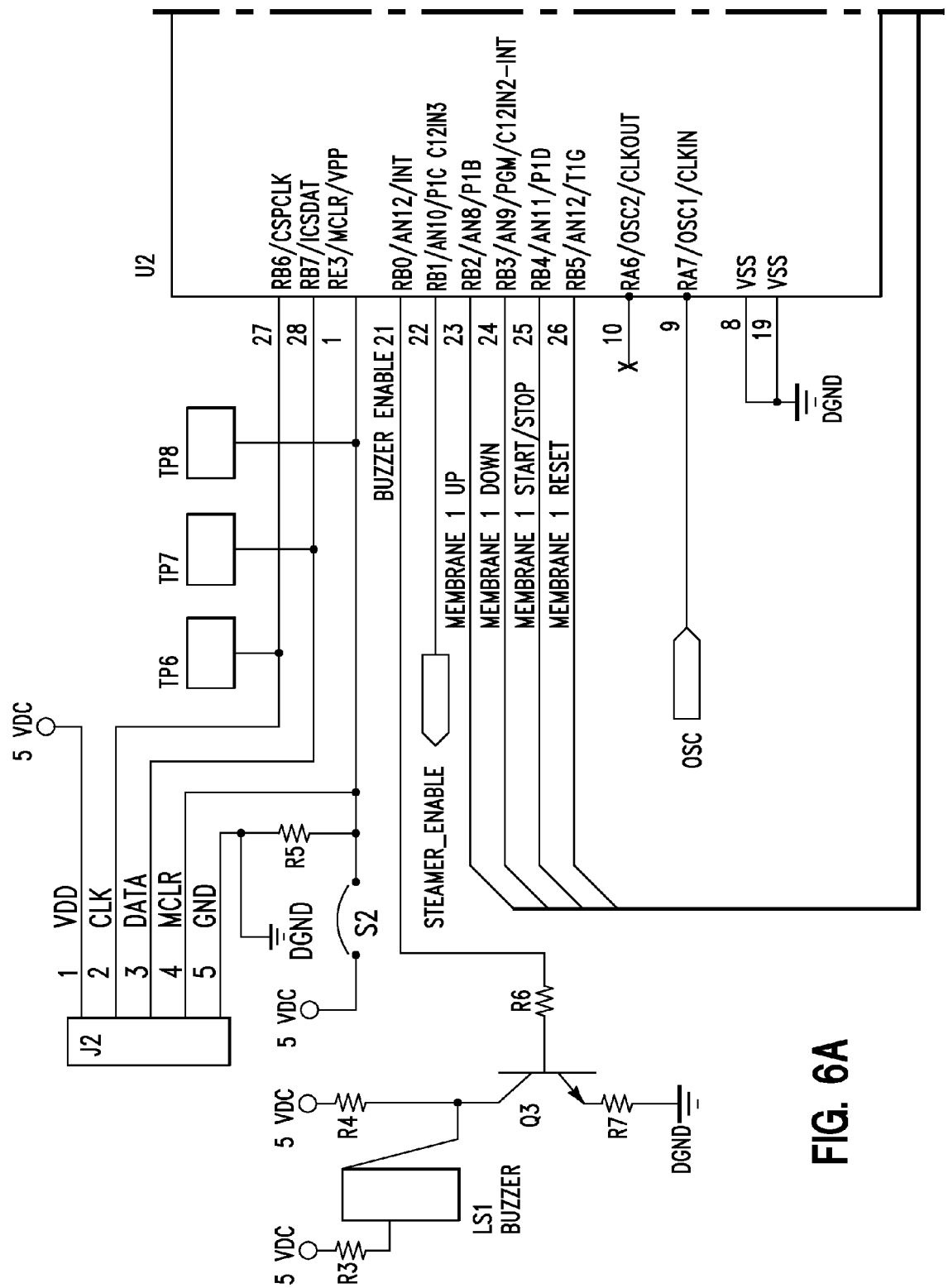

Main microcontroller MCU U2, as shown in FIG. 6a-6b, such as part number PIC 16F882 from Microchip Technology, Inc., Chandler Ariz., controls starting and stopping of steamers, operation of buzzer LS1, and timing.

Main microcontroller MCU U2 has programming connector J2 with leads that connect to the programming ports of the MCU, to 5VDC and to ground. With its own connection for programming, MCU U2 can be programmed without the steamer itself being connected to a power source.

R5 is a pull down resistor which keeps the memory clear pin MCLR, pin 1 of the MCU, low unless the programmer or switch S2 pulls it high to reset the MCU once programming is complete.

Buzzer LS1, which is used to alert the user when the steaming cycle of one of the containers has finished, has both of its contacts connected to 5VDC. Pin 1 of buzzer LS1 is connected to 5V through current limiting resistor R3. Transistor Q3 is in a common collector configuration that keeps pin 2 of LS1 at 5VDC through pull up resistor R6. This keeps the buzzer off because there is an equal potential across its leads. However, when pin 21 of MCU U2 goes high Q3 turns on, lowering the voltage at pin 2 of buzzer LS1, and allowing current to flow through the buzzer, sounding the alarm.

Power to MCU U2 is filtered further through capacitors C5 and C4 which filter out both low and high frequency oscillations. Thus, electromagnetic interference picked up by traces on the printed circuit board are filtered out.

Connector J3A is the interface between motherboard 302 and timer interface board 304 that determines how long a steamer is on. Timer interface board 304 includes LCDs. The current timing for steamer 1 is controlled by MCU U2 on motherboard 302 through pins 11, 14, and 16, known as a serial peripheral interface or SPI interface. The four button switches, S7-S10, for the user interface for steamer 1 on timer interface board 304, pass through connector J3A to pins 23, 24, 25 and 26 of MCU U2 on motherboard 302. S7 provides up command, S8 down command, S9 start/stop command, and S10 reset command. UP and DOWN commands to the MCU are interpreted and sent over the SPI interface to the timer circuit. When the START/STOP button is pressed, steamer 1 enable pin 22 is turned on which starts steamer 1. The LCD for steamer 1 is turned on when a voltage on pin 6 of MCU U2 is sensed. When steamer 2 is sensed through pin 4 of MCU U2, pin 17 turns on, and this enables another MCU (not shown) that controls steamer 2. Further description of the timing circuit is discussed herein below.

Figure 6C:
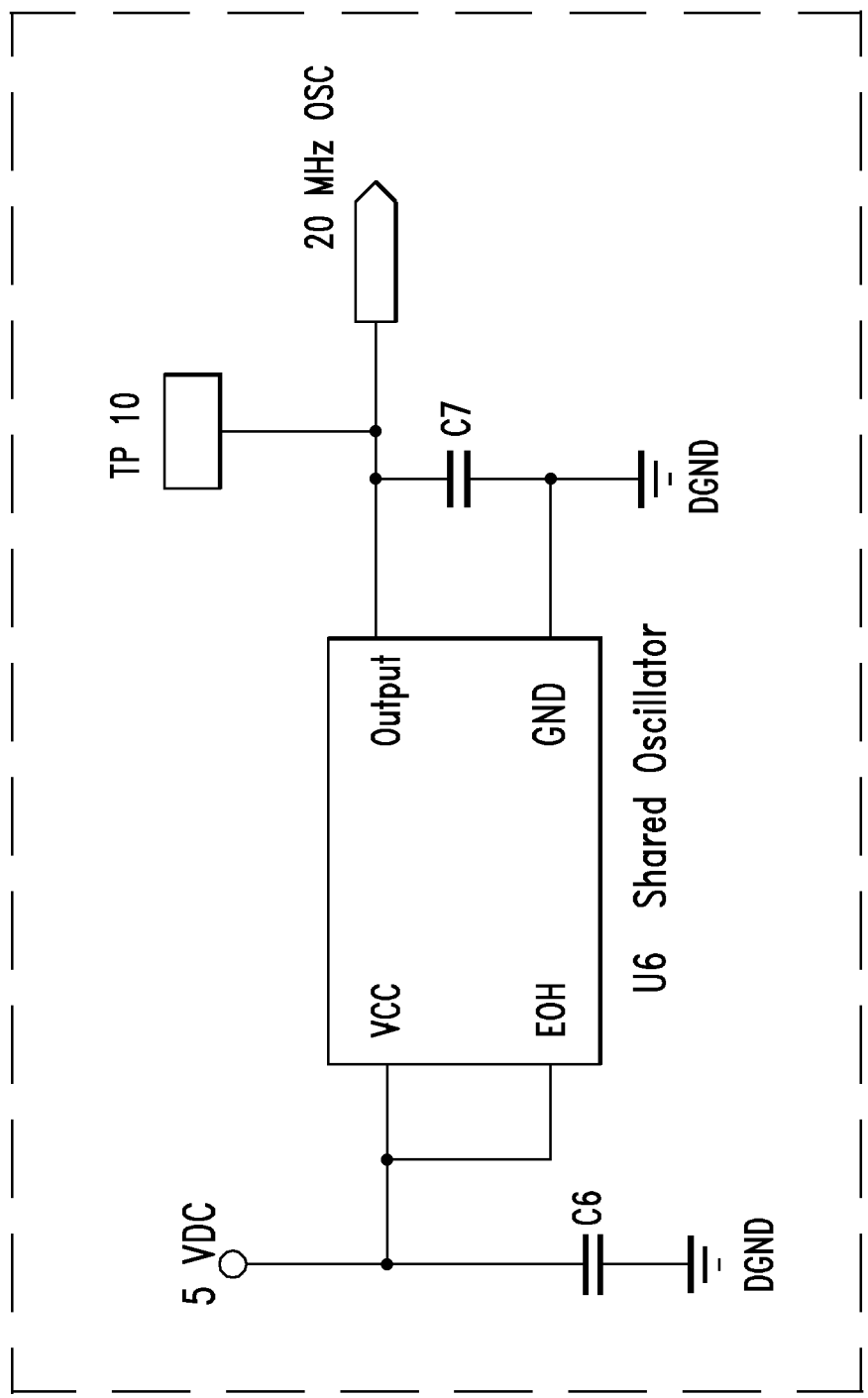
FIG. 6c is a schematic diagram of the shared oscillator for an embodiment of a liquid heating system of the present patent application.

Oscillator U6, shown in FIG. 6c, is a global oscillator that is tried to the two MCUs for the two steamers, as shown in FIG. 6b. Capacitor C6 and C7 are decoupling capacitors used to smooth the voltage into the oscillator as well as balance the output oscillation that goes to the MCUs. The result is a clean, high impedance 20 MHZ signal to keep both MCUs at a steady timing.

Timer and User Interface Circuit

In operation, the cook uses the four buttons to start operation and set how long each of the steamers will be on. In one embodiment, the cook selects picks the time he or she wants in 30 second increments up to 20 minutes using the up and down switches and then hits the start button. The time through the steaming process is displayed on the LCD display. The LCD is a segmented display that needs a relatively high amount of current to power each segment. The LCD driver takes the driving load for the LCD display off the MCU.

Figure 7C:
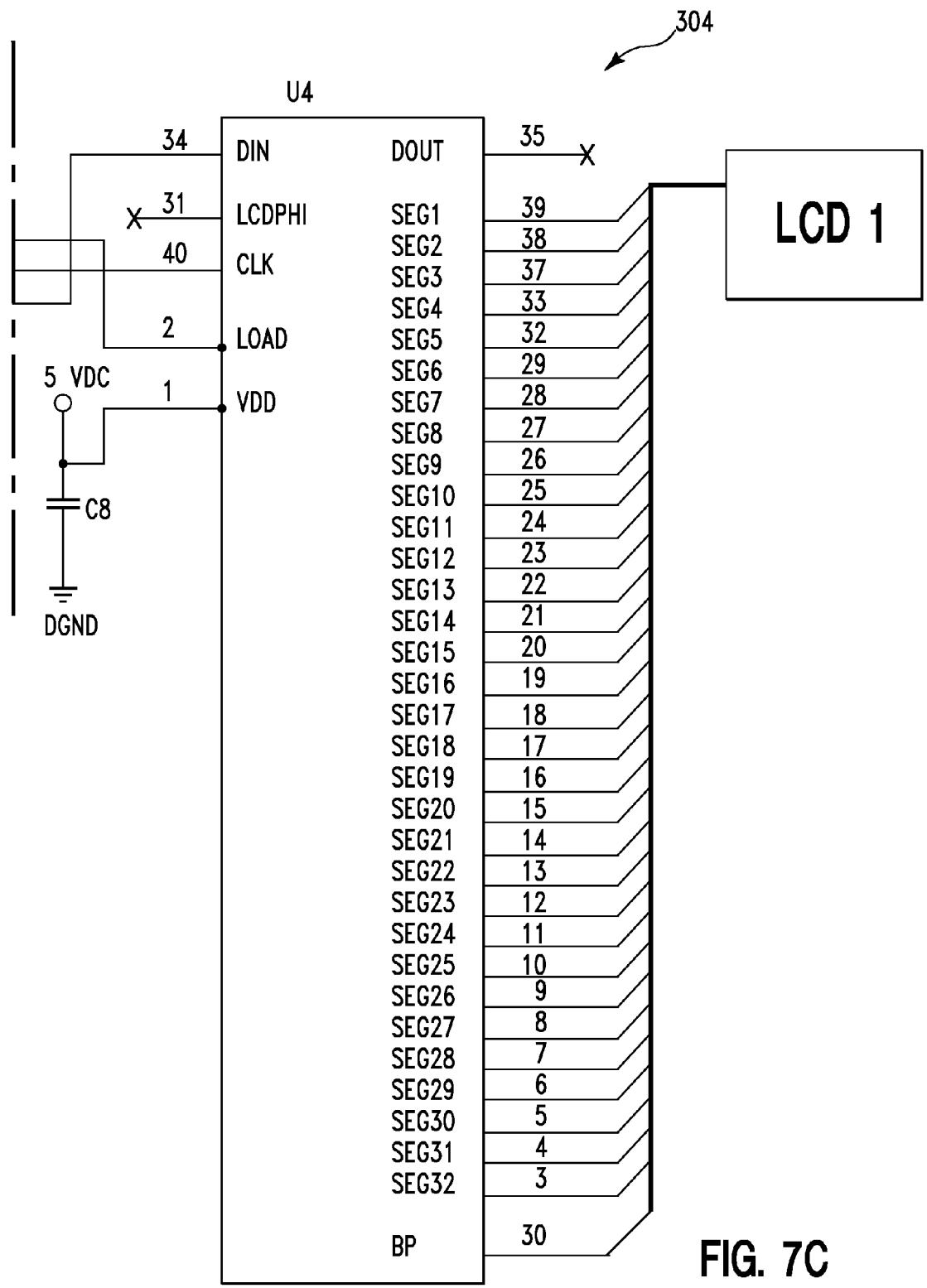

LCD driver U4 is a 7 segment LCD driver, such as part number AY0438 from Microchip Technology, Inc., Chandler Ariz., as shown in FIG. 7. The SPI signal from MCU U2 on motherboard 302 is sent to LCD driver U4 and the specified pins on LCD driver U4 are pulled high, the corresponding segments of the LCD are illuminated. Capacitor C8 is a decoupling capacitor allowing a clean 5VDC into the driver.

Membrane switches S3, S4, S5 and S6 are built into the same package and are of the pull up variety. When any of these switches is pressed 5 VDC is pulled up to the pin on MCU U2 that the switch is connected. R7, R8, R9 and R10 are the pull down resistors keeping the pins at ground until the switch is pressed.

Figure 8B:
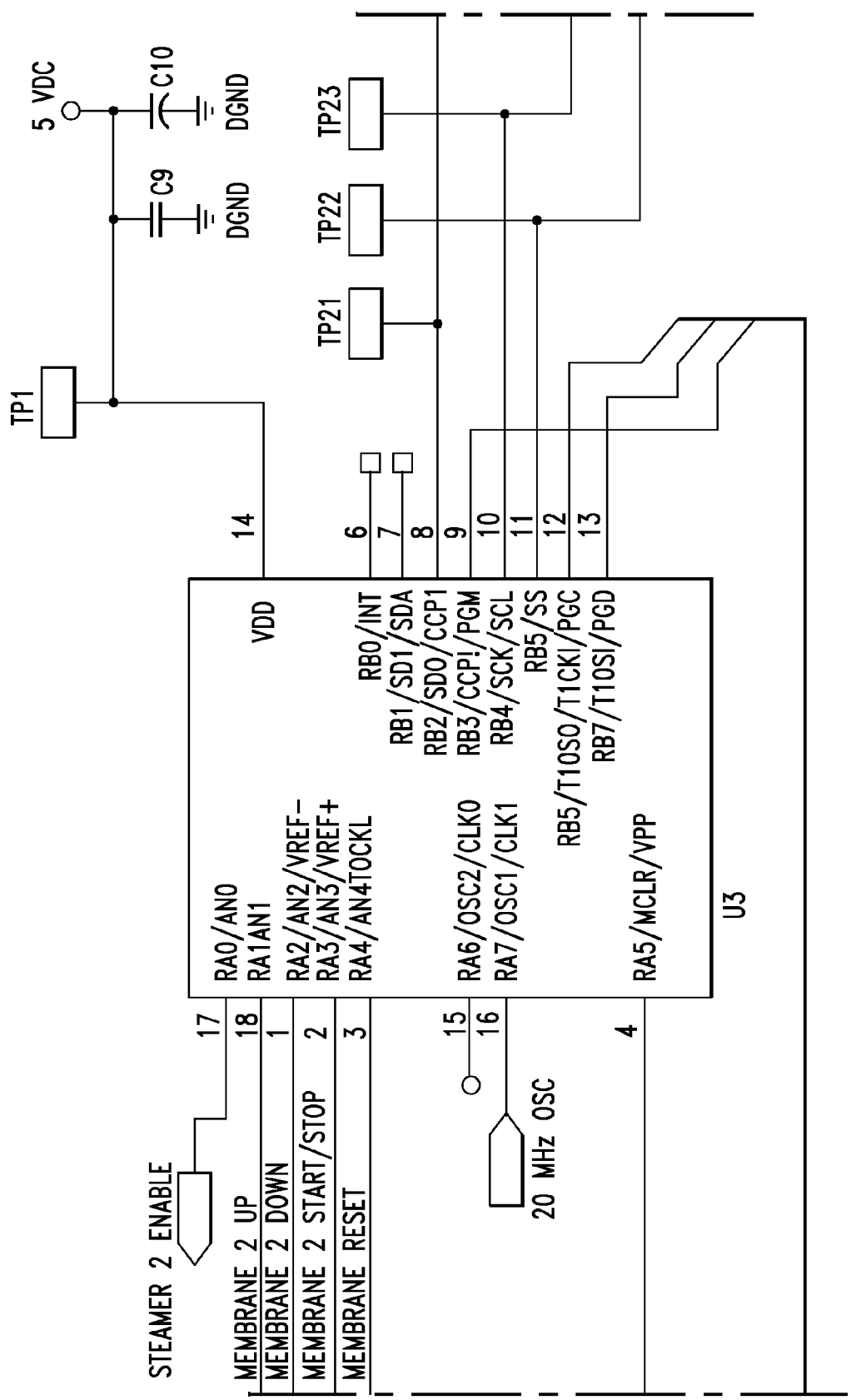
Figure 8C:
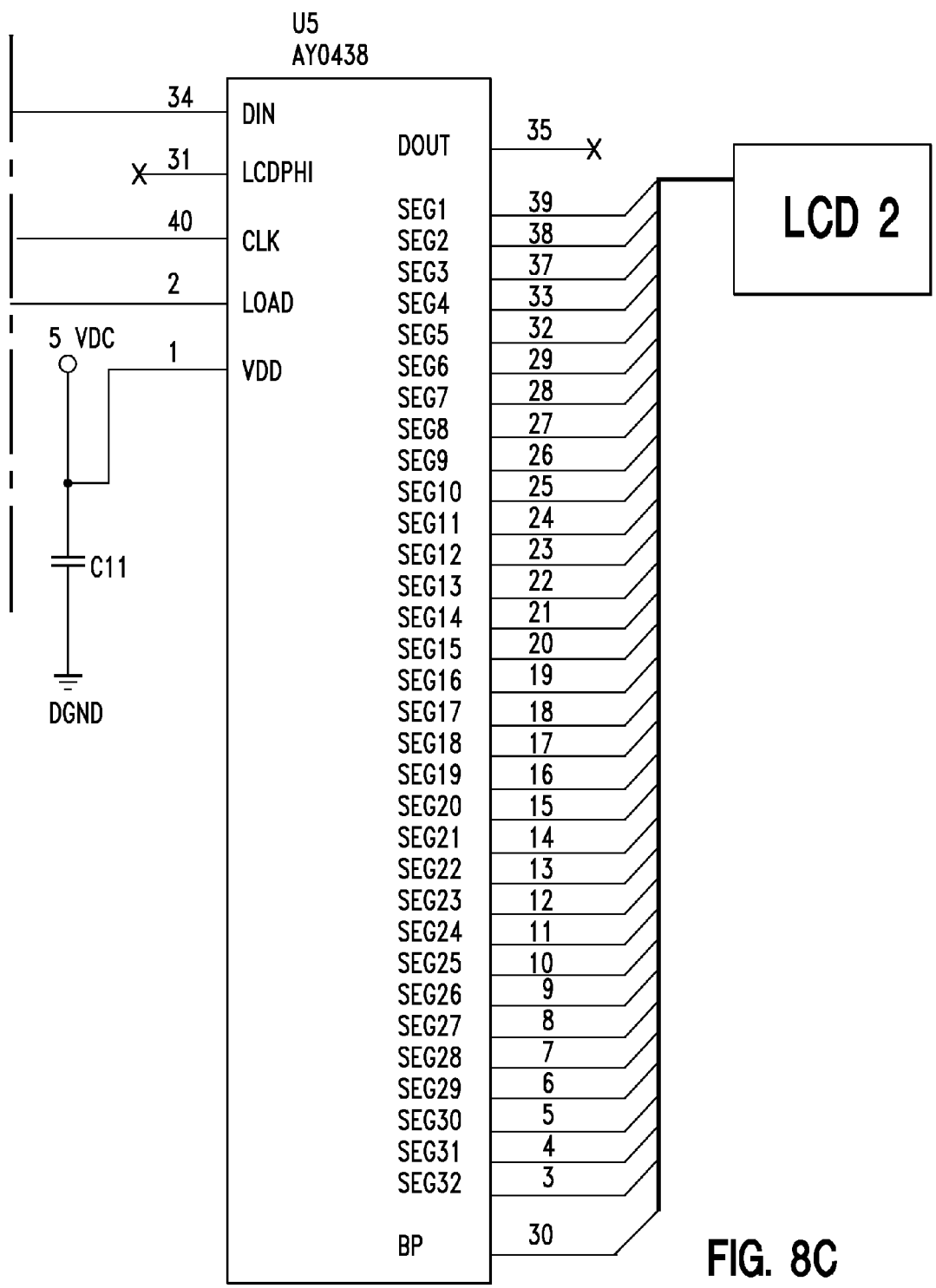
Figure 8D:
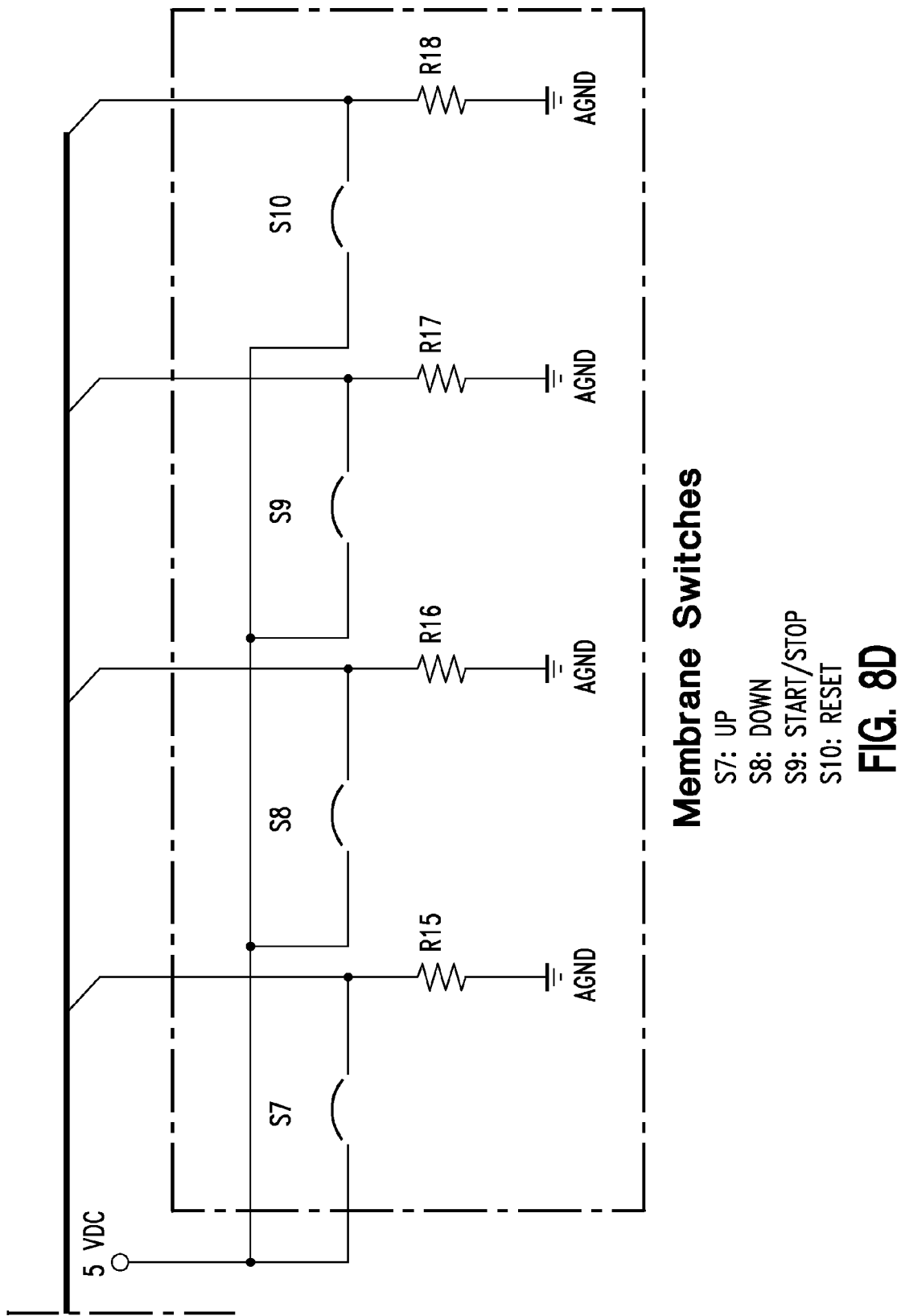

A second MCU U3, as shown in FIG. 8, is used to independently control the second steamer.

The same type of program connector is attached to second MCU U3 for programming, as shown in FIG. 8, such as the PIC16F818 microcontroller from Microchip Technology, Inc. Transistor Q4, which is of the NPN variety, and therefore normally open, is used to keep memory clear MCLR pin on MCU 2 Program Header 304 high at normal operating times through pull up resistor R9. MCU 1 can enable U3 by turning on Q4 and opening the transistor which then pulls MCLR low.

The same membrane switches, S7-S10 are used for steamer 2 and the same circuit is implemented with resistors R15-R18. MCU U3 sends SPI controls to LCD Driver U5 through pins 8, 10 and 11 and decoupling capacitor C11 allows a clean 5VDC to pass to the driver even with an EMI susceptible ribbon cable connecting power to the interface board. Capacitors C9 and C10 are again high and low filters for a clean signal into MCU U3.

Figure 9A:
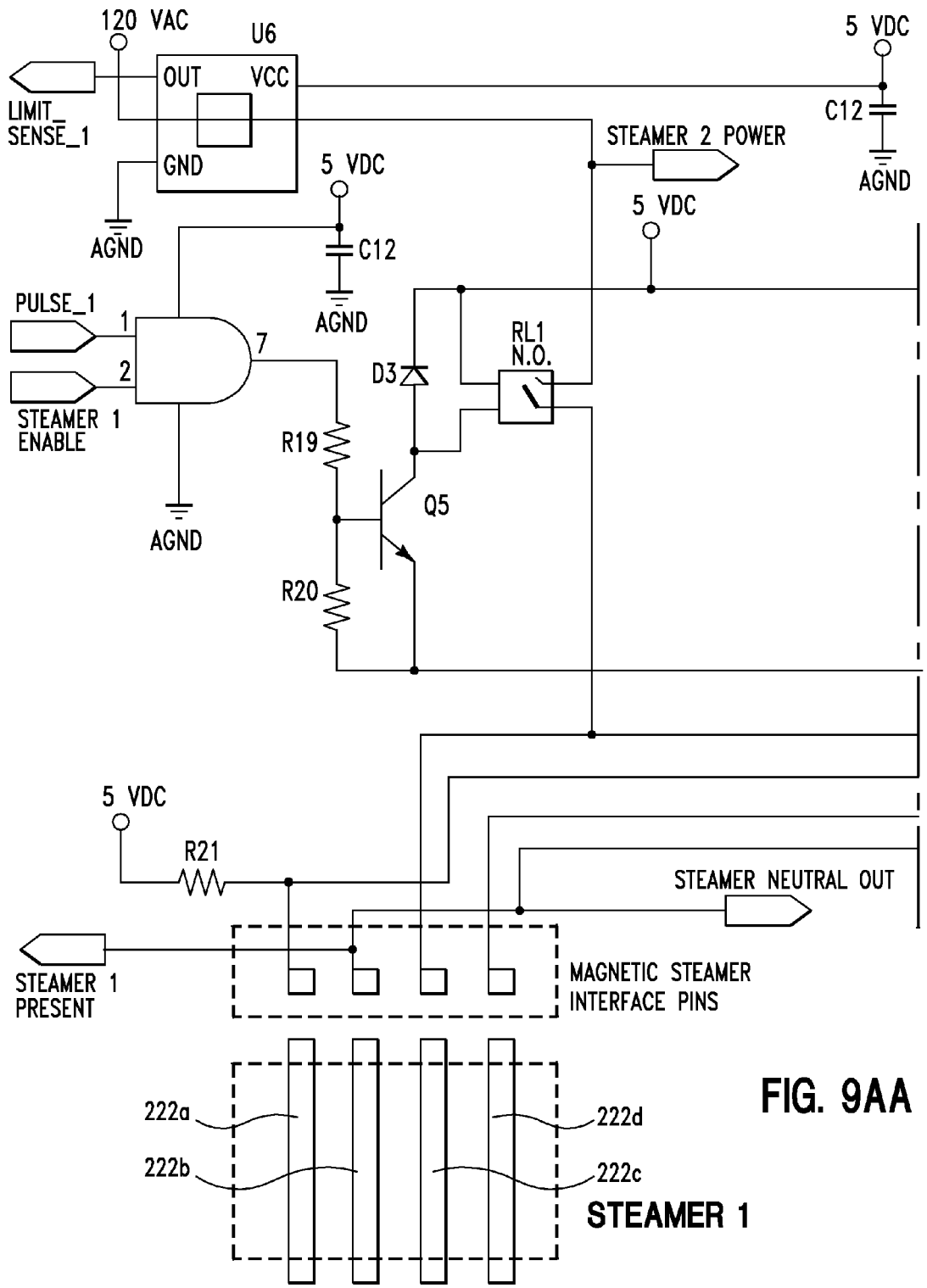
FIG. 9a, including FIG. 9aa-9ab, and FIG. 9b, including FIG. 9ba-9bb, are schematic diagrams of the steamer 1 control circuit and the steamer 2 control circuit of an embodiment of a liquid heating system of the present patent application showing one way current level is limited.
Figure 9B:
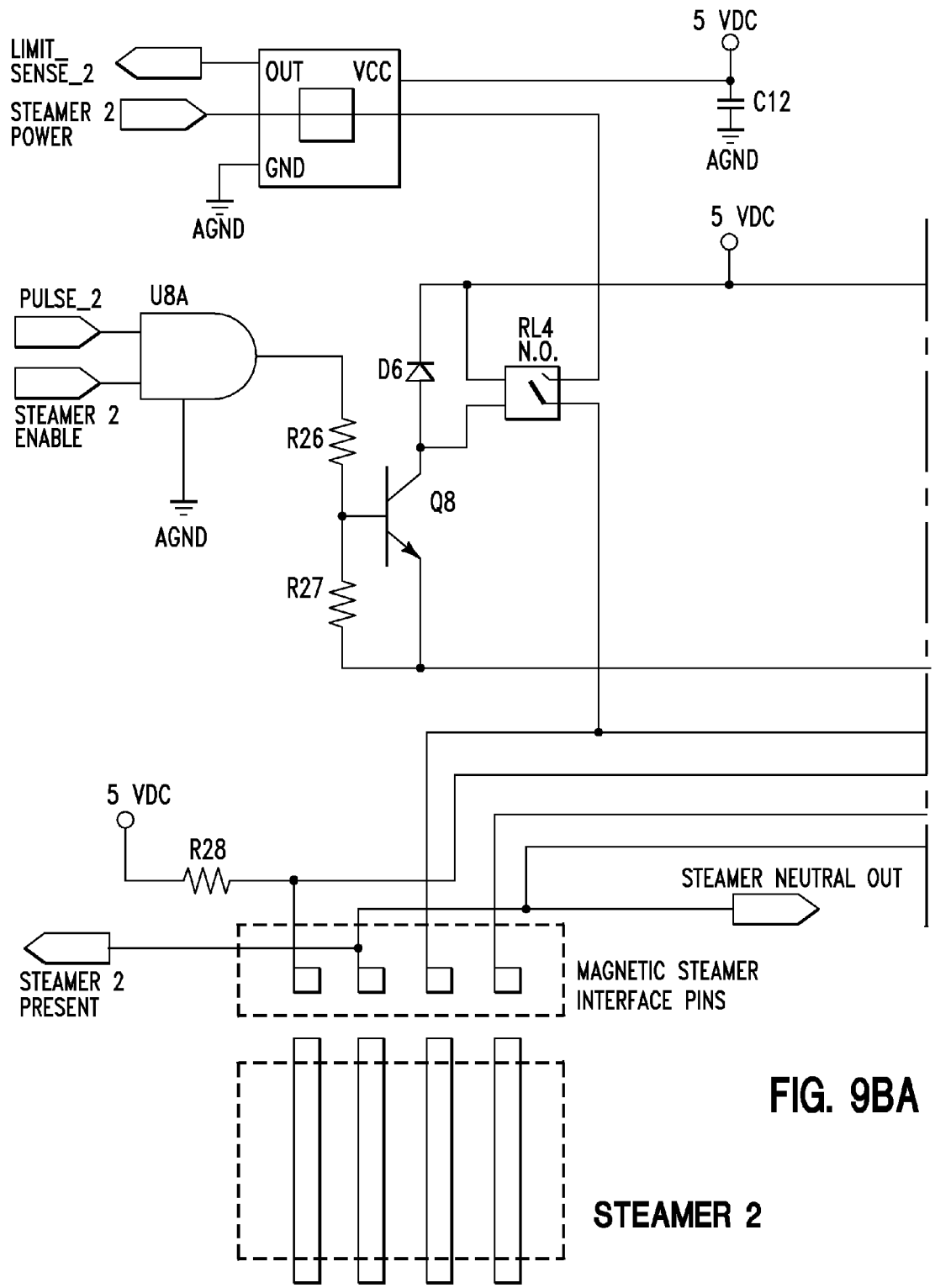
Figure 9B:
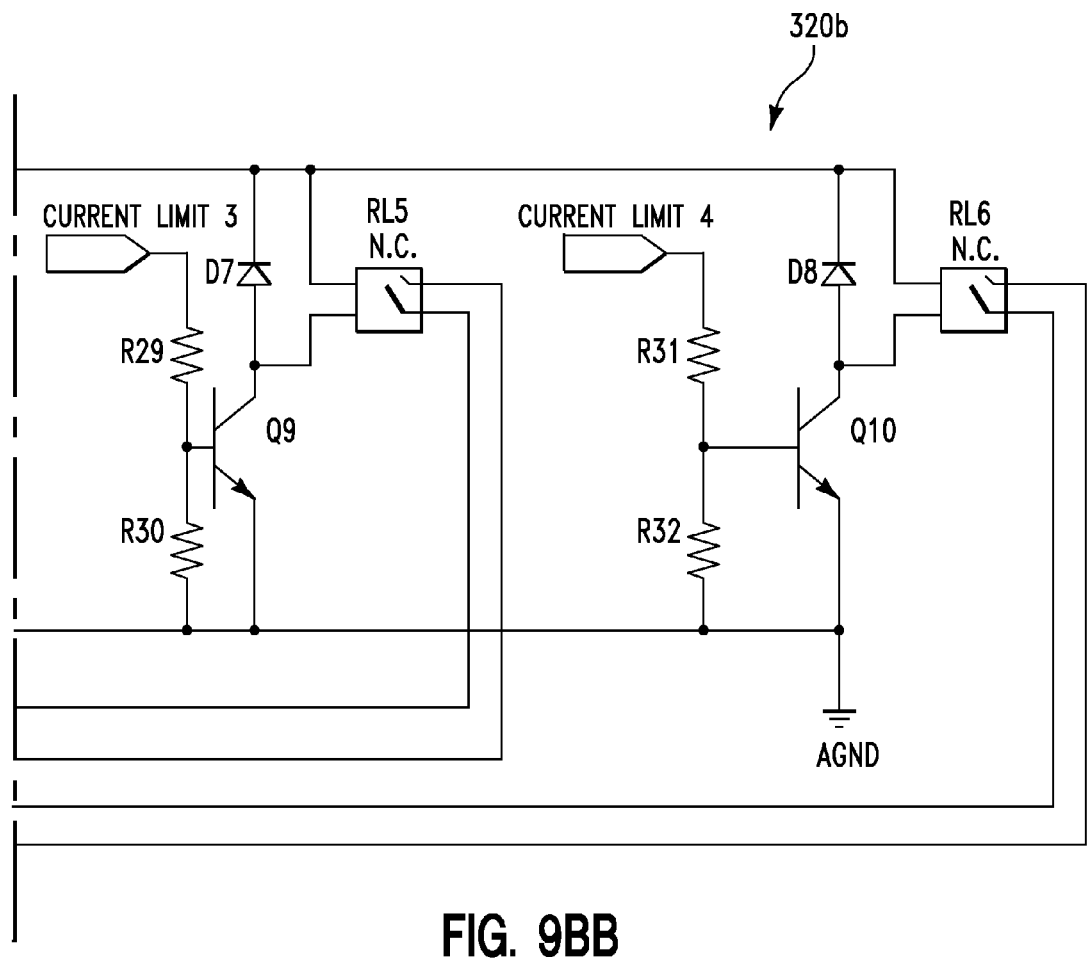

Current Limiting Circuit:

Current flowing through water 224 in steamers 220 depends on the applied voltage, the conductivity of water 224, and the area of electrodes 222 providing current. Current flowing through water 224 in steamers 220 is also limited by current limiting circuits 320a, 320b for each steamer 220, as shown in FIGS. 9a, 9b, and pulse width modulation circuit 322, shown in FIG. 10.

Pulse width modulation circuit 322 connects to pin 1 of AND gate U8A. The corresponding steamer enable is connected to pin 2 of AND gate U8A. AND gate U8A provides that when a pulse is received from pulse width modulation circuit 322 the output goes to 5VDC if the corresponding steamer enable bit is also set high. AND gate U8A is connected to control the state of relays RL1 and RL4 through control transistors Q5 and Q8, allowing relays RL1 and RL4 for steamers 1 and 2 to close and 120 VAC to pass through relays RL1 and RL4 into the current "dropout" circuitry. The dropout circuitry for each container includes 3 relays acting as gates for the steamer power. When U8's output goes high, its 5 VDC output pulls voltage between current limiting resistors R19 and R20 high which turns on Q5 and therefore allows a 5 volt potential across the relay coil which closes the relay. Resistor R20 is a pull down resistor which keeps Q5 in the completely off state, allowing very little to no leakage current to flow over RL1s coil when U8 is off.

Normally closed relays RL2 and RL3 for steamer 1 and RL5 and RL6 for steamer 2 are the current limiting relays. They are controlled with the same circuitry as used for RL1 and RL4 through current limit 1, 2, 3 and 4 enable pins on MCU U2. Since these relays are normally closed MCU U2 does not have to set a current limit pin high in order to allow current to flow through each of these relays. However, if current exceeds a threshold, the relays will be opened, as described herein below.

Steamers 220 each include 4 metal conducting tube- or bar-shaped electrodes 222, including power electrodes 222a and 222c and neutral electrodes 222b and 222d. Relays RL2 and RL5 control power connection to power electrode 222a. Relays RL3 and RL6 control ground connection of neutral electrode 222d. When current sensor U6 senses 15 amps, current sensor U6 triggers relay RL2 to open and, if steamer 2 is present, RL5 to open, which turns off one power lead, cutting the current by 33 percent. If again U6 senses 15 amps RL3 and if steamer 2 is connected RL6 is turned off which cuts one of the neutral leads out for each steamer, cutting that current in half.

Current sensor U6 triggers the relays by sending a signal along LIMIT_SENSE 1, which is an input to MCU U2 (plc). An output from MCU U2 sends the signal to CURRENT LIMIT 1 for RL2 and to CURRENT LIMIT 2 for RL3, which are tied to the coil side of the respective solid state relays.

These current limiting relays can also be used to reduce current flow once the water has started to boil. In one embodiment, the sensor detects a current drop that occurs when water in the steamer starts to boil. The sensor then cuts out one or two relays to provide a current level that will maintain boiling without wasting power. In another embodiment, a temperature sensor is used, and current is cut when the sensor provides a temperature reading indicating boiling.

The presence of steamers 220 in 226 is sensed through resistor R21 for Steamer 1 and resistor R28 for steamer 2, as shown in FIGS. 9a, 9b. When the steamers are in place they create a low current electrical path to the steamer 1 present and steamer 2 present pins on the MCU alerting the MCU that the steamer is there and effectively starting the LCD interface.

As water boils, bubbles reduce its conductivity. The current sensing circuit reads a corresponding current drop when water in steamers 220 starts boiling, and when this current drop occurs a logic circuit notifies a cook time timer to initiate count-down timing from a pre-set condition entered by the cook. In this way the time circuit compensates for variation in the heat-up to steam time and cook times in steam become repeatable.

In one embodiment, electric current controller 440 is divided into two separate parts. First pulse width modulation circuit 442 for dividing power to the steamer units, and second AC current limiter 444, which is placed in series with the main power to the steamers in order to limit the current to a safe value for residential use.

Pulse width modulator circuit 442 includes three primary stages containing operational amplifiers. When OR gate U9A senses either of the enable signals for the steamers, it outputs a 5VDC signal which is passed to operational amplifier U6A which is set up in a comparator state. 5VDC is connected to its negative terminal at all times through resistor R28. Therefore when U9A sends 5 VDC to its positive pin, op amp U6A senses that each pin is equal and outputs 5VDC which starts the pulse circuit. Stage one, is a simple buffer stage, also known as a voltage follower, which includes a timing resistor network, including variable resistor R1 and fixed resistor R2, which connects to positive input 3 of op amp U1A, while output 1 of op amp U1A is fed back into negative terminal 2 of this same op amp U1A. Capacitor U17 and resistor R31 create a filter for the feedback signal insuring a steady buffered output. Op amp U1A can be an op amp such as low power quad operational amplifier LM324, from National Semiconductor, Santa Clara, Calif. This configuration with a negative feedback loop allows for a zero output impedance to the second stage, thus allowing the second stage input to not be pulled down if it draws current. And because of the variable DC input provided by variable resistor R1, stage one allows the DC offset level of the circuit to be adjusted to a desired value.

The second stage, which is connected to stage 1 through R3, is a triangle wave generator which includes a non-inverting amplifier configuration, also known as a Schmitt trigger. Values R3 and R4 control switching threshold $V_T$ of op amp U1B based on the equation $V_T=(R3/R4)*V_{sat}$ where, $V_{sat}$ is equal to the power supply voltage, which in this case is 5 VDC that is supplied to pin 4 of each op amp. This switching threshold $V_T$ tells when the output of op amp U1B at pin 7 should switch based on the negative input value at pin 6. Capacitor C2 and resistor R5 form an RC circuit with an RC time constant equal to R5\*C2, and they provide a feedback loop to the negative input of op amp U1B at pin 6. Thus, as C2 charges and discharges at a frequency of R5\*C2 negative terminal 6 of op amp U1B sees voltage swings of 0 to 5 volts. An op amp connected with feedback, as in stage 2 of pulse width modulator 444, adjusts its output at pin 7 to make its negative input at pin 6 equal to its positive input at pin 5. The result is known as an a stable multivibrator where the output at pin 7 oscillates in time with the variation at negative input pin 6 which is based on this R5\*C2 time constant. The waveform at pin 7 of op amp U1B thus appears as a triangle wave varying up to 5 volts as C2 discharges and readjusts back down to 0 volts as C2 recharges.

The third stage of pulse width modulator 444 includes a voltage divider and two op amps, U1C and U1D, set up in a comparator circuit. Each comparator is set up opposite the other, with the "compare" input connected to positive input 12 of op amp U1D and negative input 9 of op amp U1C. The same is true for the reference input, which is at a fixed voltage determined by voltage divider R6-R7 connected to negative input 13 of op amp U1D and positive input 10 of op amp U1C. In the case illustrated with the resistance values for R6 and R7 shown in FIG. 11, that fixed voltage is 3.7 V. This fixed voltage at input 10 will trigger op amp U1C to output a high voltage at around 5 V when a voltage at or above 3.7 V is provided to pin 9 by the output of the second stage, as determined by the DC offset set in stage 1. This fixed voltage at input 13 will also trigger op amp U1D to output a low voltage at around 0 V when that 3.7 V or higher is simultaneously provided to pin 12. Because the two comparators are set up opposite one another, the two op amps will never provide high or low voltage outputs at the same time. Rather the output of one op amp will be high when the voltage provided to its variable input swings above the trigger point, around the top of the triangle wave, while that same high input voltage forces the other op amp's output to be low. Thus, the triangle wave provided to op amps U1C and U1D results in a square wave appearing on the output of each of these two op amps, and these two square waves are 180 degrees out of phase with each other.

In one embodiment, variable resistor R1 is adjusted to set the offset voltage of stage 1 to get, a 50% duty cycle for each output. A 50% duty cycle means that each of the two square waves has a 5 volt value for half the time and a 0 volt value for the other half. This adjustment of variable resistor R1 sets where on the triangle wave each op amp will trigger. Having the offset voltage set to a value equal to half the voltage swing of the triangle wave will provide a 50% duty cycle. Setting the offset voltage in other positions will correspondingly change the duty cycle.

Figure 11:
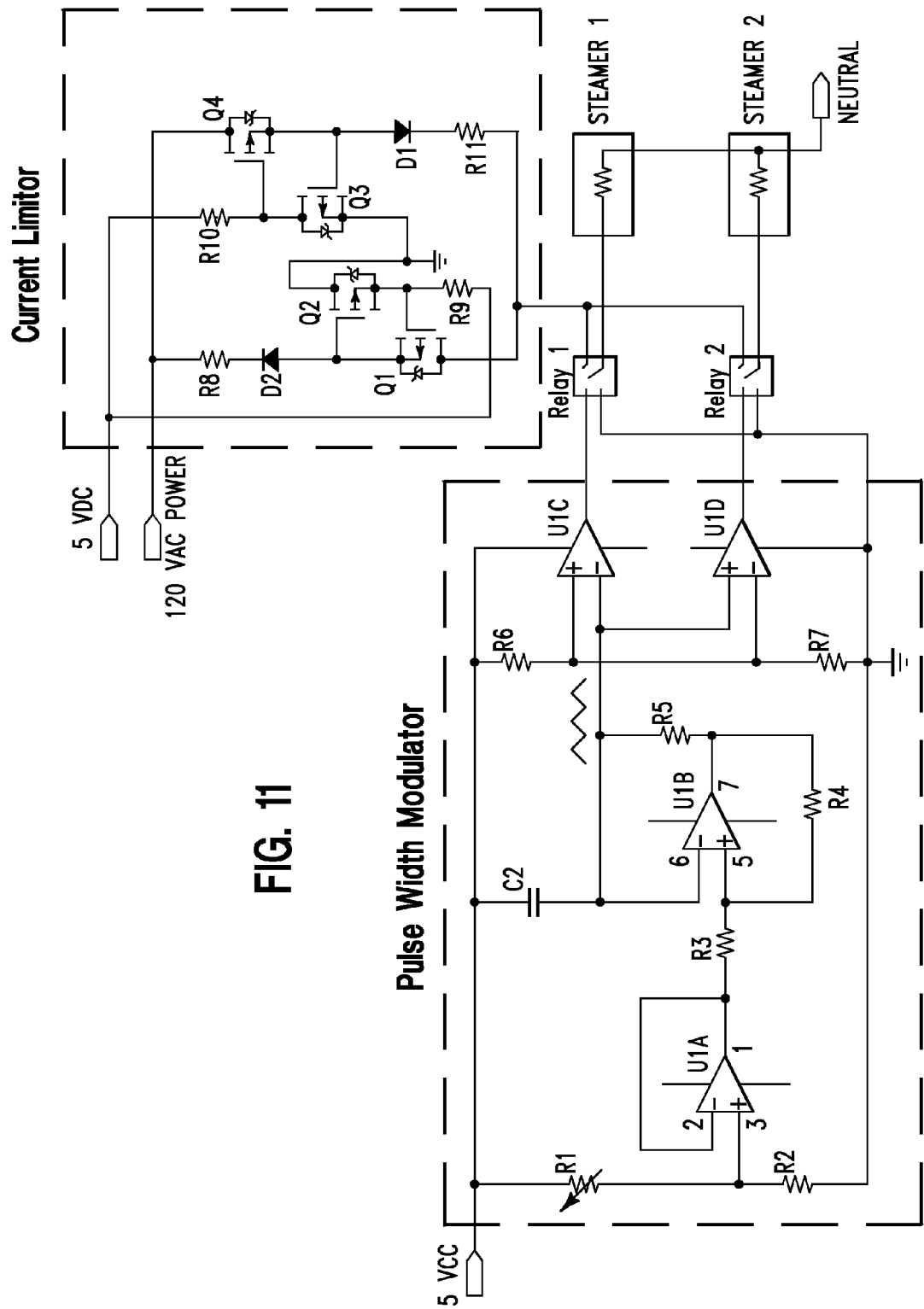
FIG. 11 is a schematic diagram of another embodiment of a pulse width modulation circuit for sharing current between two containers.

The outputs of the third stage are connected to the coils of relays 1 and 2 which control the flow of current from the 120 Volt supply to the electrodes in the two containers. Thus, when one relay is closed, allowing current to flow to one steamer, the other relay is open, preventing current from flowing to the other steamer. Thus pulse width modulator circuit 444 provides that, with one power supply simultaneously connected across the power terminals of both relays, the opposite switching action of the two relays sends power to one of the two containers at a time in an alternating manner.
Current Limiting Circuit:

One embodiment of current limiting circuit 444 is illustrated in FIG. 11 limiting the current that can pass through relays 1 and 2. The current limiting circuit consists of two halves. Each half is a gate for each direction of an AC wave.

N-mos transistor Q4, is connected to high power diode D1 and resistor R11 of a low resistance, and all three of these components are in series with the load, resistive water 224 in container 220. When AC current from a wall power outlet flows through transistor Q4, diode D1 allows only the positive half of the AC wave to pass through. The signal continues through resistor R11, across which a voltage drop equal to IR appears. N-mos transistor Q3, with its gate attached to the anode side of diode D1 senses this voltage plus the 0.7 volts across D1. When this voltage reaches the threshold voltage of transistor Q3, transistor Q3 turns on, passing current from drain to source and lowering the voltage at the drain side of transistor Q3. The drain side of this sensing transistor Q3 is tied to the gate of power transistor Q4, so as the voltage increases across D1 and power resistor R11, the gate of q4 is pulled toward ground, thus limiting the current until the voltage across diode D1 and power resistor R11 is just below the threshold of sensing transistor Q3. Pull-up resistor R10 connects between the 5 VDC power supply and the gate of power transistor Q4, allowing Q4 to be on at all times except when sensing transistor Q3 is turned on. The steady 5 VDC attached to pull up resistor R10 allows a steadier on-off threshold. This circuit is mirrored and flipped in the opposite direction to allow the negative portion of the AC current to also be used and limited, as shown in FIG. 11. Transistor Q1 which is attached to Diode D2 and power resistor R8 form the series return path for the negative portion of the AC wave with current sensor Q2 attached to the anode of diode D2. The output of power transistors Q4 and Q1 are tied to the positive side of relay 1 and relay 2. Since pulse width modulator 142 portion of circuit 140 provides that when one of the relays is turned on, the regulated current at no more than the current limit flows to the steamer connected to that relay while the other relay is turned off and the steamer connected to it receives no current.

Figure 12:
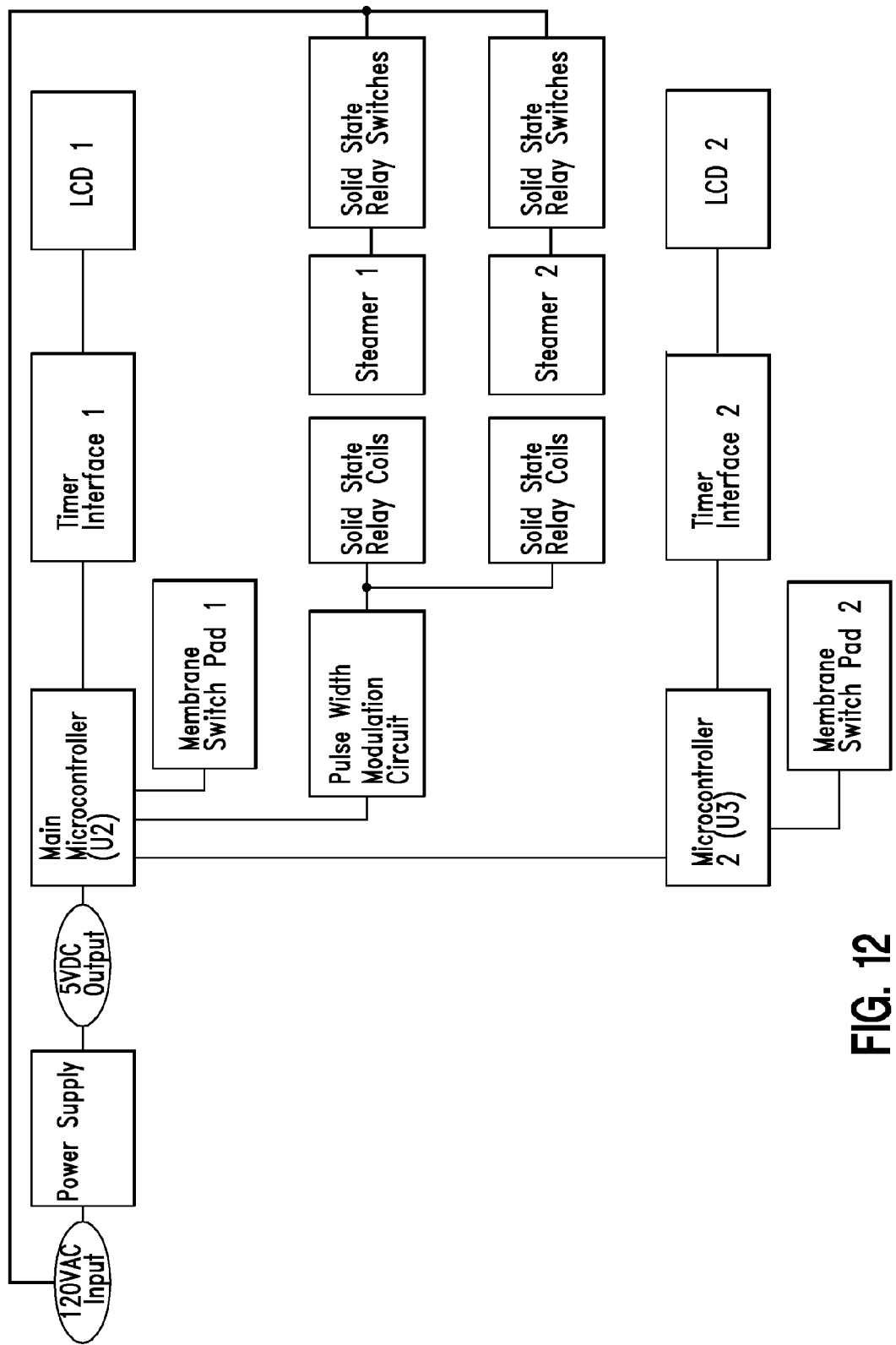
FIG. 12 is a block diagram showing the various components of an embodiment of a liquid heating system of the present patent application.

The interconnection between circuits shown in FIGS. 5a-11 are shown in the block diagram of FIG. 12. The bold lines in FIG. 12 represent full 120 Volt line voltages and the lighter lines represent 5 Volt dc electronic control circuit Voltages. In the example a 120 volt ac line Voltage is provided but other Voltages can be used.

The 120 Volt line voltage feeds both the power supply circuit of FIG. 5a as well as two sets of solid state relay switches. The load side of the solid state relay switches is connected to each of the two steamer containers, labeled steamer 1 and steamer 2. The solid state relay switches are in a normally open condition, so no voltage is applied to the steamers until the control circuits send a signal voltage to the coils of the solid state relays which allow the relays to close, applying the 120 Volt line voltage to their respective steamer containers.

The 120 Volt ac line voltage is converted to 5 Volts dc in the power supply circuit of FIG. 5a. This 5 Volt supply powers the main micro-controller of FIG. 6a. The main micro-controller has inputs and outputs from the membrane switch pad 1 circuit and the timer interface 1 circuits respectively. The timer interface 1 circuit controls the output to LCD 1 to visually show the operator the timer functions.

The main microcontroller also sends input and output signals to microcontroller 2, which then communicates with membrane switch pad 2 and timer interface 2, controlling the output to LCD 2 in the same fashion as timer interface 1 above.

Figure 10A:
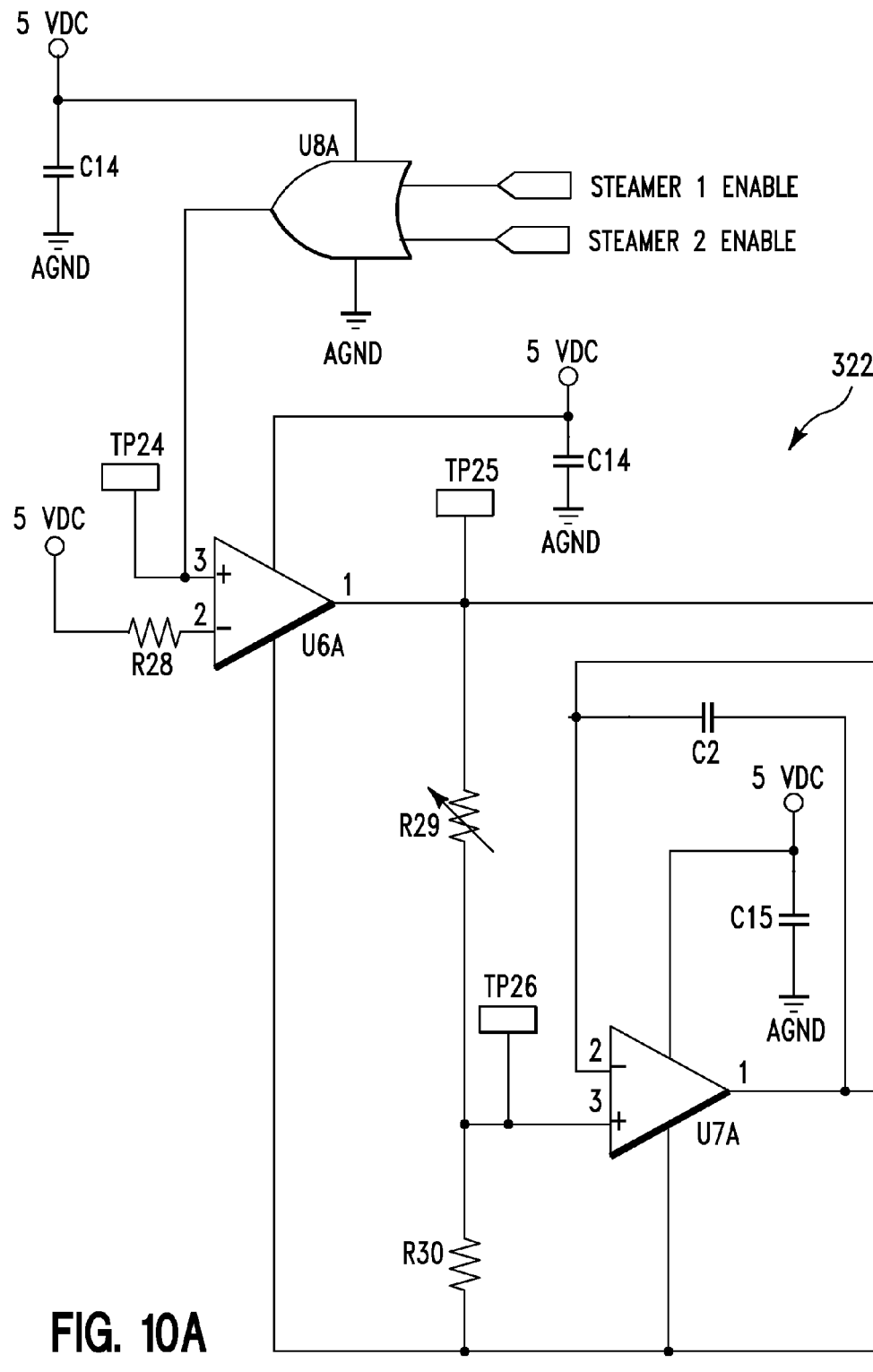

The main microcontroller also controls the pulse width modulation circuit of FIG. 10. When the two steamer containers are in place and a cooking cycle has begun, pulse width modulation circuit pulses an output signal to each of the 2 solid state relay switch sets allowing the 120 Volt line voltage to pass through to the steamer containers, thereby creating heat within the containers to cook the food product.

While the disclosed methods and systems have been shown and described in connection with illustrated embodiments, various changes may be made therein without departing from the spirit and scope of the invention as defined in the appended claims.

The invention claimed is:

1. A liquid heating system, comprising an electric current controller, a first container, and a second container, wherein said first container includes a first liquid and a first electric heating system, wherein said second container includes a second liquid and a second electric heating system, wherein said electric current controller is connected to said first electric heating system and to said second electric heating system, wherein said electric current controller is configured to automatically alternate between providing electric current to said first electric heating system and to said second electric heating system, wherein when said electric current controller is providing said electric current to said first electric heating system said electric current controller provides no electric current to said second electric heating system and wherein when said electric current controller is providing said electric current to said second electric heating system said electric current controller provides no electric current to said first electric heating system.

2. A liquid heating system as recited in claim 1, wherein said first liquid is conductive and wherein said first electric heating system includes said electric current passing through said first liquid.

3. A liquid heating system as recited in claim 2, wherein said first container includes a first food steamer.

4. A liquid heating system as recited in claim 1, wherein said first container includes a plurality of electrodes, wherein said electric current controller includes a circuit for limiting current flowing in said liquid to a preselected current level without changing voltage applied between said electrodes.

5. A liquid heating system as recited in claim 4, wherein said circuit for limiting current flowing in said liquid includes a circuit for removing one of said electrodes from connection to power or neutral while leaving at least one other of said electrodes connected to power and at least one other of said electrodes connected to neutral.

6. A liquid heating system as recited in claim 1, wherein each said steam container includes four electrodes.

7. A liquid heating system as recited in claim 6, further comprising a control circuit to disconnect contact to one of said four electrodes if current passing through said conductive water solution exceeds a threshold.

8. A liquid heating system as recited in claim 7, wherein said electric current controller circuit disconnects connection to a second of said four electrodes if current passing through said conductive liquid exceeds a second threshold.

9. A liquid heating system as recited in claim 1, wherein said electric current controller includes a circuit for adjusting time for providing electric current to said first electric heating system and for providing no electric current to said first electric heating system.

10. A liquid heating system as recited in claim 9, wherein said circuit for adjusting time for providing electric current to said first electric heating system and for providing no electric current to said first electric heating system includes a pulse width modulation circuit.

11. A liquid heating system as recited in claim 9, wherein each said container includes four electrodes.

12. A liquid heating system as recited in claim 9, further comprising a source of electric current that has a maximum current capacity, wherein said electric current controller is arranged to be connected to said source of electric current and arranged to maintain said electric current to each container of said plurality of containers at a level that is equal to or greater than half of said maximum current capacity.

13. A liquid heating system as recited in claim 9, wherein said electric current controller includes a current sensor positioned for measuring said electric current, wherein said electric current controller is connected for using information from said current sensor to automatically reduce said power provided to one of said containers by disconnecting electrical connection to one of said plurality of electrodes.

14. A liquid heating system as recited in claim 9, wherein said electric current controller is configured to switch between providing all electric current exclusively to a first container of said plurality of containers and providing all electric current exclusively to a second container of said plurality of containers.

15. A liquid heating system as recited in claim 9, wherein said base unit includes an interlock, wherein each container includes a cover, wherein said cover activates said interlock when said container with said cover is inserted in said base unit, wherein power can be supplied only when said cover activates said interlock.

16. A liquid heating system as recited in claim 9, wherein each container includes a steam chamber for holding food for steaming.

17. A liquid heating system as recited in claim 9, wherein electric current flow is arranged to automatically turn off when said conductive liquid level falls below one electrode of said pair of electrodes.

18. A liquid heating system as recited in claim 9, wherein said electric current controller includes a circuit for limiting current flowing in said conductive liquid to a preselected current level without changing voltage applied between said electrodes.

19. A liquid heating system as recited in claim 9, wherein said electric current controller includes a circuit for adjusting time for providing electric current to said electrodes and for providing no electric current to said electrodes.

20. A liquid heating system as recited in claim 19, wherein said circuit for adjusting time for providing electric current to said electrodes and for providing no electric current to said electrodes includes a pulse width modulation circuit.

21. A liquid heating system, comprising an electric current controller and a plurality of containers, wherein each container of said plurality of containers holds a first electrode, a second electrode, and a conductive liquid, wherein each said conductive liquid has a conductivity, wherein said first electrode and said second electrode are connected to said electric current controller to provide an electric current passing through said conductive liquid, wherein said electric current controller includes a circuit that provides said electric current to pass through said conductive liquid in one of said containers for a period of time while not providing said electric current to pass through another conductive liquid in any another container during that same period of time, wherein said electric current controller sequentially and automatically provides said current to said conductive liquid in all of said containers during a multiple of said period of time.

22. A liquid heating system as recited in claim 21, further comprising a source of electric current that has a maximum current capacity, wherein said electric current controller is connected to said source of electric current and maintains said electric current to each container of said plurality of containers at a level that is equal to or greater than half of said maximum current capacity.

23. A liquid heating system as recited in claim 22, wherein said electric current controller maintains said electric current to each container of said plurality of containers at a level that is equal to or greater than ¾ of said maximum current capacity.

24. A liquid heating system as recited in claim 21, wherein said conductive liquid includes water and wherein said electric current controller maintains said electric current to each container of said plurality of containers at a level to cause said water to boil and generate steam.

25. A liquid heating system as recited in claim 21, wherein said electric current controller includes a current sensor positioned for measuring said electric current, wherein said electric current controller is connected for using information from said current sensor to automatically maintain said electric current at a specified level for each container of said plurality of containers.

26. A liquid heating system as recited in claim 21, wherein said electric current controller is configured to switch between providing all electric current exclusively to a first container of said plurality of containers and providing all electric current exclusively to a second container of said plurality of containers.

27. A liquid heating system as recited in claim 21, wherein said electrodes are fabricated of a material including at least one from the group consisting of titanium and graphite.

28. A liquid heating system as recited in claim 21, wherein each of said containers is fabricated of a material including at least one from the group consisting of high density polyethylene, PTFE, glass, and a dielectric coated metal.

29. A liquid heating system as recited in claim 21, wherein each of said containers includes a cover, wherein said cover includes an adjustable steam vent.

30. A liquid heating system as recited in claim 21, further comprising a base unit, wherein each container of said plurality of containers includes an electrical connector for connection to said base unit.

31. A liquid heating system as recited in claim 30, wherein said base unit includes an interlock, wherein each container includes a cover, wherein said cover activates said interlock when said container with said cover is inserted in said base unit, wherein power can be supplied only when said cover activates said interlock.

32. A liquid heating system as recited in claim 30, wherein each container includes a handle permitting manually connecting said container to said base unit, wherein said handle is located on a side of said container opposite said electrical connector.

33. A liquid heating system as recited in claim 21, wherein each container includes a steam chamber for holding food for steaming.

34. A liquid heating system as recited in claim 21, further comprising a control circuit to disconnect contact to one of said electrodes if current passing through said conductive water solution exceeds a threshold.

35. A liquid heating system as recited in claim 34, wherein each said steam container includes a third and a fourth electrode, wherein said electric current controller circuit disconnects connection to a second of said electrodes if current passing through said conductive liquid exceeds a second threshold.

36. A liquid heating system as recited in claim 21, wherein said electric current controller includes a circuit for limiting current flowing in said liquid to a preselected current level without changing voltage applied between said first and said second electrodes.

37. A liquid heating system as recited in claim 24, further comprising using said steam for cooking food.

38. A liquid heating system, comprising a base unit and a plurality of electric steam containers, wherein each said steam container includes a pair of electrodes and a conductive water solution, wherein said pair of electrodes are configured to provide electric current passing through said conductive water solution for heating said conductive water solution, wherein each of said electric steam containers is removably electrically connected to said base unit with a quick connect and quick release connector, wherein said base unit provides an automatic control function over operation of each said electric steam container and wherein steam is generated in each said electric steam container independently of any other electric steam container being connected.

39. A liquid heating system as recited in claim 38, wherein each said steam container includes four electrodes.

40. A liquid heating system as recited in claim 39, further comprising a control circuit to disconnect contact to one of said four electrodes if current passing through said conductive water solution exceeds a threshold.

41. A liquid heating system as recited in claim 38, wherein electric current flow automatically turns off when said conductive water solution level falls below one electrode of said pair of electrodes.

42. A liquid heating system as recited in claim 38, wherein each said container includes a plurality of electrodes, wherein said electric current controller includes a circuit for limiting current flowing in said liquid to a preselected current level without changing voltage applied between said electrodes.

43. A liquid heating system as recited in claim 40, wherein said electric current controller circuit disconnects connection to a second of said four electrodes if current passing through said conductive liquid exceeds a second threshold.

44. A liquid heating system, comprising a base unit and a plurality of containers, wherein said base unit includes an electric current controller that is connected to provide an automatic control function over operation of each said container, and wherein the conductive liquid is heated in each said container independently of any other container being connected when said container holds the conductive liquid, wherein each said container includes a plurality of electrodes, wherein said electric current controller is configured to reduce power provided to one of said containers by disconnecting electrical connection to one of said plurality of electrodes in said container if current passing through said conductive liquid exceeds a threshold.

45. A liquid heating system as recited in claim 44, wherein said electric current controller is arranged to maintain said electric current to each container of said plurality of containers at a level that is equal to or greater than ¾ of said maximum current capacity.

* * * * *